United States Patent
Tsuboi et al.

(10) Patent No.: US 9,505,913 B2
(45) Date of Patent: Nov. 29, 2016

(54) POLYLACTIC ACID RESIN COMPOSITION

(71) Applicants: KAO CORPORATION, Chuo-ku, Tokyo (JP); TOKAI CHEMICAL INDUSTRIES, LTD., Kani-gun, Gifu (JP)

(72) Inventors: Tomoya Tsuboi, Sakai (JP); Masahiro Mori, Wakayama (JP); Mari Azumi, Minokamo (JP)

(73) Assignees: KAO CORPORATION, Tokyo (JP); TOKAI CHEMICAL INDUSTRIES, LTD., Kani-Gun (JP)

( * ) Notice: Subject to any disclaimer, the term of this patent is extended or adjusted under 35 U.S.C. 154(b) by 0 days.

(21) Appl. No.: 14/768,268

(22) PCT Filed: Mar. 4, 2014

(86) PCT No.: PCT/JP2014/055476
§ 371 (c)(1),
(2) Date: Aug. 17, 2015

(87) PCT Pub. No.: WO2014/141952
PCT Pub. Date: Sep. 18, 2014

(65) Prior Publication Data
US 2016/0002443 A1 Jan. 7, 2016

(30) Foreign Application Priority Data

Mar. 13, 2013 (JP) ................... 2013-050949

(51) Int. Cl.
C08K 3/08 (2006.01)
C08L 67/04 (2006.01)
C08K 7/14 (2006.01)
C08J 5/00 (2006.01)
C08K 3/10 (2006.01)
C08K 5/11 (2006.01)
C08K 5/20 (2006.01)
C08K 5/5357 (2006.01)
C08L 101/16 (2006.01)

(52) U.S. Cl.
CPC .. C08K 7/14 (2013.01); C08J 5/00 (2013.01); C08K 3/08 (2013.01); C08K 3/10 (2013.01); C08K 5/11 (2013.01); C08K 5/20 (2013.01); C08K 5/5357 (2013.01); C08J 2333/02 (2013.01); C08K 2201/016 (2013.01); C08L 101/16 (2013.01)

(58) Field of Classification Search
CPC .. C08K 3/10; C08K 2003/0812; C08K 3/00; C08L 67/04
See application file for complete search history.

(56) References Cited

U.S. PATENT DOCUMENTS

| | | |
|---|---|---|
| 2004/0180990 A1 | 9/2004 | Suzuki et al. |
| 2010/0063177 A1 | 3/2010 | Takenaka et al. |
| 2010/0210756 A1 | 8/2010 | Takenaka et al. |
| 2010/0292381 A1* | 11/2010 | Kamikawa ............... C08K 5/14 524/394 |
| 2010/0331446 A1 | 12/2010 | Takenaka et al. |
| 2012/0296017 A1 | 11/2012 | Tsuboi et al. |

FOREIGN PATENT DOCUMENTS

| | | |
|---|---|---|
| CN | 102206407 A | 10/2011 |
| JP | 2001-269978 A | 10/2001 |
| JP | 2003-55569 A | 2/2003 |
| JP | 2004-155855 A | 6/2004 |
| JP | 2004-269765 A | 9/2004 |
| JP | 2007-145912 A | 6/2007 |
| JP | 2008-115372 A | 5/2008 |
| WO | WO 02/062900 A1 | 8/2002 |
| WO | WO 2011/096299 A1 | 8/2011 |

OTHER PUBLICATIONS

International Search Report, dated May 13, 2014, for International Application No. PCT/JP2014/055476.
Database WPI, Week 200838, Thomson Scientific, London, GB, AN 2008-F95982, XP002761495, & JP 2008 088369 A, Apr. 17, 2008, abstract.
European Patent Office Communication and extended search report issued in the corresponding European Patent Application No. 14765242.4 on Sep. 21, 2016.

* cited by examiner

Primary Examiner — Vickey Nerangis
(74) Attorney, Agent, or Firm — Birch, Stewart, Kolasch & Birch, LLP

(57) ABSTRACT

A polylactic acid resin composition containing a polylactic acid resin, glass fibers having an average aspect ratio (average fiber length/average fiber diameter) of 5 or more, and a metallic pigment, wherein the glass fibers are contained in an amount of from 2 to 35 parts by mass, and the metallic pigment is contained in an amount of from 0.1 to 8 parts by mass, based on 100 parts by mass of the polylactic acid resin. Since the polylactic acid resin composition of the present invention has excellent moldability, and is capable of providing a molded article with high designability, including a transparent surface layer and an inner layer with a lamellar texture in the nashiji patterns, the polylactic acid resin composition can be suitably used in various industrial applications, such as daily sundries, household electric appliance parts, packaging materials for household electric appliance parts, and automobile parts.

14 Claims, 2 Drawing Sheets

POLYLACTIC ACID RESIN COMPOSITION

FIELD OF THE INVENTION

The present invention relates to a polylactic acid resin composition. More specifically, the present invention relates to a polylactic acid resin composition having excellent designability, which can be used as industrial manufactured articles, a molded article obtainable by injection-molding the composition, and a method for producing the molded article.

BACKGROUND OF THE INVENTION

Polylactic acid resins have some features that polylactic acid resins are inexpensive because L-lactic acid used as a raw material is produced from sugars extracted from maize, potato or the like according to a fermentation method, that an amount of carbon dioxide discharged is very small because the raw materials are derived from plants, and that the resins have such properties as being strongly rigid and highly transparent, so that the utilization of the polylactic acid resins is expected at present.

Patent Publication 1 discloses a thermoplastic resin composition comprising 100 parts by mass of a resin composition composed of (a) 30 to 99.5% by mass of a thermoplastic resin and (b) 0.5 to 70% by mass of glass, blended with (c) 1 to 25 parts by mass of a plasticizer and (d) 0.05 to 10 parts by mass of a lustering material, in order to have a surface external appearance of a molded article with a texture of depth, and form three-dimensional patterns (silky tones).

In addition, Patent Publication 2 discloses a resin composition containing a polylactic acid (PLA), a polypropylene (PP) having a weight-average molecular weight of 100,000 or more, and an inorganic filler, in order to make it possible to mold a resin composition provided with high designability with a texture of depth, and silky and matte tones.
Patent Publication 1: WO 2002/062900
Patent Publication 2: Japanese Patent Laid-Open No. 2007-145912

SUMMARY OF THE INVENTION

The present invention relates to the following [1] to [3]:
[1] a polylactic acid resin composition containing a polylactic acid resin, glass fibers having an average aspect ratio (average fiber length/average fiber diameter) of 5 or more, and a metallic pigment, wherein the glass fibers are contained in an amount of from 2 to 35 parts by mass, and the metallic pigment is contained in an amount of from 0.1 to 8 parts by mass, based on 100 parts by mass of the polylactic acid resin;
[2] a polylactic acid resin molded article, obtainable by injection-molding a polylactic acid resin composition as defined in the above [1]; and
[3] a method for producing a polylactic acid resin molded article, including injection-molding a polylactic acid resin composition as defined in the above [1].

DETAILED DESCRIPTION OF THE INVENTION

Figure 1:
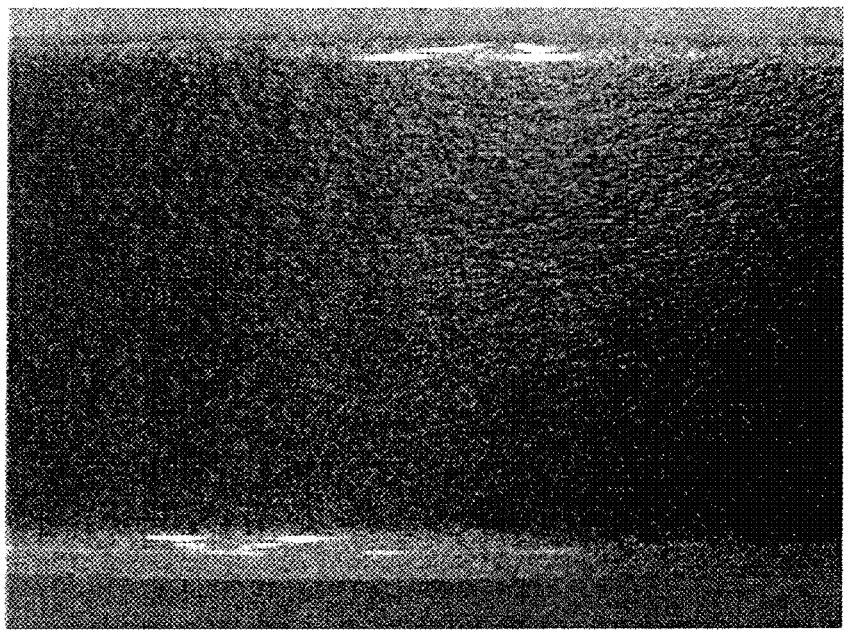
FIG. 1 is a view showing an entire surface of an injection-molded article of Example 1 (magnification: 2 folds).

In the methods of Patent Publications 1 and 2, those having designability of being transparent, and having a lamellar texture in nashiji (satin-finished surface) patterns cannot be accomplished.

The present invention relates to a polylactic acid resin composition having excellent moldability, and being capable of providing a molded article having high designability, including a transparent surface layer and an inner layer with a lamellar texture in the nashiji patterns formed therein, a molded article obtainable by injection-molding the composition, and a method for producing the molded article. Here, a lamellar texture means a lustrous texture caused by metal pieces.

The polylactic acid resin composition of the present invention exhibits some excellent effects that the polylactic acid resin composition has excellent moldability, and is capable of providing a molded article having high designability, including a transparent surface layer and an inner layer with a lamellar texture in the nashiji patterns formed therein.

<Polylactic Acid Resin Composition>

The polylactic acid resin composition of the present invention contains a polylactic acid resin, glass fibers, and a metallic pigment.

(Polylactic Acid Resin)

The polylactic acid resin in the present invention refers to a polylactic acid, or a copolymer of a lactic acid and a hydroxycarboxylic acid. The hydroxycarboxylic acid includes glycolic acid, hydroxybutyric acid, hydroxyvaleric acid, hydroxypentanoic acid, hydroxycaproic acid, hydroxyheptanoic acid, and the like, and glycolic acid and hydroxycaproic acid are preferred.

Preferred molecular structures of the polylactic acid are those composed of from 80 to 100% by mol of either unit of L-lactic acid (L-form) or D-lactic acid (D-form), and from 0 to 20% by mol of a lactic acid unit in a symmetric form thereof In addition, it is preferable that the copolymer of a lactic acid and a hydroxycarboxylic acid is composed of from 85 to 100% by mol of either unit of L-lactic acid or D-lactic acid, and from 0 to 15% by mol of a hydroxycarboxylic acid unit.

These polylactic acid resins can be obtained by selecting one having a structure that is needed from L-lactic acid, D-lactic acid, and a hydroxycarboxylic acid as raw materials, and subjecting the components to dehydration polycondensation. Preferably, the polylactic acid resin can be obtained by selecting one having a structure that is needed from a lactide, which is a cyclic lactic acid dimer, a glycolide, which is a cyclic glycolic acid dimer, a caprolactone, or the like, and subjecting the components to a ring-opening polymerization. The lactides are in the form of L-lactide, which is a cyclic L-lactic acid dimer; D-lactide, which is a cyclic D-lactic acid dimer; meso-lactide, which is a cyclic dimer of D-lactic acid and L-lactic acid; and DL-lactide, which is a racemic mixture of the D-lactide and the L-lactide. In the present invention, any one of the lactides can be used, and the D-lactide or the L-lactide is preferred as the main raw material.

In the present invention, it is preferable to use a polylactic acid resin having a high optical purity of the lactic acid component, from the viewpoint of improving moldability of the polylactic acid resin composition. Specifically, L-form or D-form is contained in an amount of preferably 80% by mol or more, L-form or D-form is contained in an amount of more preferably 90% by mol or more, L-form or D-form is contained in an amount of even more preferably 95% by mol or more, L-form or D-form is contained in an amount of even more preferably 98% by mol or more, and L-form or D-form is contained in an amount of even more preferably 99% by mol or more, of the entire lactic acid component of the polylactic acid resin.

In addition, in the present invention, as the polylactic acid resin, a stereocomplex polylactic acid resin may be used, from the viewpoint of improving moldability and transparency of the polylactic acid resin composition, and from the viewpoint of satisfying both strength and impact resistance of the molded article made of the polylactic acid resin composition, and improving heat resistance.

The stereocomplex polylactic acid resin is a polylactic acid resin composed of two kinds of polylactic acids, each obtained from a lactic acid component containing an isomer different from one another as a main component. One polylactic acid constituting the stereocomplex polylactic acid resin [hereinafter referred to as "polylactic acid (A)"] contains L-form in an amount of from 90 to 100% by mol, and other component including D-form in an amount of from 0 to 10% by mol. The other polylactic acid [hereinafter referred to as "polylactic acid (B)"] contains D-form in an amount of from 90 to 100% by mol, and other component including L-form in an amount of from 0 to 10% by mol. Here, other components besides L-form and the D-form include dicarboxylic acids, polyhydric alcohols, hydroxycarboxylic acids, lactone, and the like, each having a functional group capable of forming two or more ester bonds. Also, other components may be a polyester, a polyether, a polycarbonate, or the like, each having two or more unreacted functional groups mentioned above in one molecule.

A mass ratio of the polylactic acid (A) to the polylactic acid (B) in the stereocomplex polylactic acid resin, i.e. polylactic acid (A)/polylactic acid (B), is preferably from 10/90 to 90/10, more preferably from 20/80 to 80/20, and even more preferably from 40/60 to 60/40.

The weight-average molecular weight of the polylactic acid resin is preferably 100,000 or more, and more preferably 150,000 or more, from the viewpoint of improving mechanical properties of the molded article made of the polylactic acid resin composition, and the weight-average molecular weight is preferably 400,000 or less, and more preferably 350,000 or less, from the viewpoint of improving flowability during the molding of the polylactic acid resin composition. Here, the weight-average molecular weight of the polylactic acid resin can be obtained by using gel permeation chromatography (GPC), with chloroform as a solvent, a high-temperature SEC column (GMHHR-H Series) manufactured by Tosoh Corporation as a column, a flow rate of 1.0 mL/min, a column temperature of 40° C., and a differential refractive index detector (RI) as a detector, and calculating using polystyrenes of known molecular weights as a reference.

Here, the polylactic acid resin can be synthesized in accordance with a known method, or commercially available manufactured products can be used. Commercially available products include, for example, ones manufactured by TOYOTA MOTOR CORPORATION under the trade names of Ecoplastic U'z, ones manufactured by Nature Works under the trade names of Nature Works, one manufactured by Zhejiang Hisun Biomaterials Co., Ltd. under the trade name of REVODE, and the like. In addition, among the above-mentioned commercially available products, ones manufactured by TOYOTA MOTOR CORPORATION under the trade names of Ecoplastic U'z S-9, S-12, and S-17, and ones manufactured by Nature Works under the trade names of Nature Works 4032D and 3001D are preferred, from the viewpoint of improving moldability.

The content of the polylactic acid resin is preferably 50% by mass or more, more preferably 60% by mass or more, even more preferably 67% by mass or more, and still even more preferably 69% by mass or more, of the polylactic acid resin composition of the present invention, from the viewpoint of improving designability of the polylactic acid resin, and the content is preferably 90% by mass or less, more preferably 80% by mass or less, and even more preferably 75% by mass or less, from the viewpoint of blending the glass fibers and the metallic pigment, thereby exhibiting high designability.

(Glass Fibers)

The polylactic acid resin composition of the present invention contains glass fibers having an average aspect ratio (average fiber length/average fiber diameter) of 5 or more in an amount of from 2 to 35 parts by mass, based on 100 parts by mass of the polylactic acid resin, from the viewpoint of giving nashiji patterns to the injection-molded article by using the glass fibers together with a metallic pigment.

The glass fibers can be used without particular limitations, so long as the glass fibers are made into filamentous fibers by melt-spinning known glass.

The average fiber length of the glass fibers is preferably 60 μm or more, more preferably 100 μm or more, even more preferably 0.5 mm or more, even more preferably 1 mm or more, and still even more preferably 2 mm or more, from the viewpoint of exhibiting nashiji patterns, and contributing to designability, and the average fiber length is preferably 20 mm or less, more preferably 15 mm or less, even more preferably 10 mm or less, even more preferably 7 mm or less, and still even more preferably 5 mm or less, from the viewpoint contributing to moldability and designability of nashiji patterns. The average fiber diameter of the glass fibers is preferably 3 μm or more, more preferably 6 μm or more, and even more preferably 10 μm or more, from the viewpoint of exhibiting nashiji patterns, and contributing to designability, and similarly, the average fiber diameter is preferably 50 μm or less, more preferably 30 μm or less, and even more preferably 20 μm or less, from the viewpoint of exhibiting nashiji patterns, and contributing to designability. The average fiber length of the glass fibers can be obtained by observing any 100 strands of fibers with an optical microscope, and calculating a number average thereof. The average fiber diameter can be obtained by the same method as described above for a diameter of a cross section of the cut glass fibers. In a case where the fiber diameter has a length and a breadth, the average fiber diameter is calculated using the length.

In addition, the average aspect ratio of the glass fibers (average fiber length/average fiber diameter) is 5 or more, preferably 10 or more, more preferably 20 or more, even more preferably 50 or more, even more preferably 100 or more, and still even more preferably 180 or more, from the viewpoint of forming nashiji patterns when the glass fibers are included in the above-mentioned polylactic acid resin to provide a molded article, and at the same time sufficiently improving mechanical strength. The average aspect ratio is preferably 1,500 or less, more preferably 1,000 or less, even more preferably 800 or less, even more preferably 600 or less, and still even more preferably 300 or less, from the viewpoint of inhibiting the lowering of mechanical strength accompanying the lowering of dispersibility of the glass fibers in the polylactic acid resin.

In the present invention, it is preferable that a fiber sizing agent is adhered to the glass fibers. As the fiber sizing agent to be adhered to the glass fibers, a silane coupling agent, a urethane resin, a polyester resin, an epoxy resin, a polylactic acid-based resin or the like can be used. The adhesion of the fiber sizing agent can be carried out in accordance with a known method. Also, the amount of adhesion can be appropriately set. Here, the amount of the polylactic acid-based resin used as a fiber sizing agent is not included in the content of the polylactic acid resin mentioned above.

Preferred glass fibers include chopped strands [one manufactured by NITTOBO, CSF3PE-941HS (average fiber length: 3 mm, average fiber diameter: 13 μm, aspect ratio: 231); ones manufactured by Nippon Electric Glass Co., Ltd., ACS9PH-901X (average fiber length: 9 mm, average fiber diameter: 18 μm, average aspect ratio: 500), and ACS13H-350Z (average fiber length: 13 mm, average fiber diameter: 14 μm, average aspect ratio: 929, etc.)]. In addition, those glass fibers that are subjected to a pulverization treatment with a known pulverizer, for example, a batch-process agitating tank type pulverizer can be used.

The content of the glass fibers is 2 parts by mass or more, preferably 3 parts by mass or more, more preferably 5 parts by mass or more, even more preferably 8 parts by mass or more, and still even more preferably 12 parts by mass or more, based on 100 parts by mass of the polylactic acid resin, from the viewpoint of improving color tones and flexural modulus of the polylactic acid resin composition, and giving a molded article nashiji patterns, and at the same time giving a molded article a lamellar texture and the formation of a transparent layer, and from the viewpoint of moldability. The content is 35 parts by mass or less, preferably 30 parts by mass or less, more preferably 28 parts by mass or less, even more preferably 24 parts by mass or less, and still even more preferably 18 parts by mass or less, from the viewpoint of giving nashiji patterns, and at the same time not inhibiting a lamellar texture and the formation of a transparent layer, and from the viewpoint of not inhibiting moldability.

(Metallic Pigment)

The polylactic acid resin composition of the present invention contains a metallic pigment in an amount of from 0.1 to 8 parts by mass, based on 100 parts by mass of the polylactic acid resin, from the viewpoint of giving a lamellar texture to an injection-molded article.

The raw materials for the metallic pigment in the present invention include metal powders, metal sulfides, and the like. The metal powders are exemplified by aluminum, gold, silver, copper, nickel, titanium, and stainless steel. The metal sulfides are exemplified by nickel sulfide, cobalt sulfide, and manganese sulfide. A metallic pigment can be produced using these raw materials in accordance with a known method. Specific metallic pigments include flat aluminum powders, spherical aluminum powders, pearl mica powders, metal-coated flat glass powders, stainless steel (SUS) powders, metal-coated thermosetting resin powders, and the like.

Among these raw materials, aluminum pigments in which raw materials are based on aluminum are preferred, from the viewpoint of giving a lamellar texture (lustrous texture), and at the same time exhibiting nashiji patterns. The content of the aluminum pigment is preferably 1% by mass or more, more preferably 30% by mass or more, even more preferably 80% by mass or more, and even more preferably substantially 100% by mass, of the metallic pigment. Here, the aluminum pigment may be processed with a resin or the like on the surface of aluminum.

The average particle size of the metallic pigment is preferably 1 μm or more, more preferably 20 μm or more, and even more preferably 40 μm or more, from the viewpoint of giving the manufactured product a lamellar texture (lustrous texture), and at the same time forming nashiji patterns and a transparent layer. The average particle size is preferably 500 μm or less, more preferably 100 μm or less, even more preferably 80 μm or less, and still even more preferably 60 μm or less, from the viewpoint of texture and a quality texture of the manufactured products, and not inhibiting the formation of a transparent layer and nashiji patterns. Here, the average particle size of the metallic pigment as used herein means a volume-median particle size $D_{50}$, and the volume-median particle size $D_{50}$ is measured with a laser diffraction/scattering particle size distribution measurement instrument "Mastersizer 2000" manufactured by Malvern Instruments, Ltd. by charging a cell for measurement with Isopar G, manufactured by Exxon Mobile Corporation, under conditions that a particle refractive index is 1.58, imaginary part of which is 0.1, and a dispersion medium refractive index of 1.42, at a concentration that gives a scattering intensity of from 5 to 15%.

The content of the metallic pigment is 0.1 parts by mass or more, preferably 0.2 parts by mass or more, more preferably 0.5 parts by mass or more, and even more preferably 0.8 parts by mass or more, based on 100 parts by mass of the polylactic acid resin, from the viewpoint of giving a molded article a lamellar texture. The content is 8 parts by mass or less, preferably 6 parts by mass or less, more preferably 4 parts by mass or less, and even more preferably 3 parts by mass or less, from the viewpoint of preventing aggregation of the metallic pigment, and at the same time not inhibiting the formation of nashiji patterns and a transparent layer, and from the viewpoint of not inhibiting moldability.

In addition, the mass ratio of the glass fibers to the metallic pigment (glass fibers/metallic pigment) is preferably 1 or more, more preferably 2 or more, even more preferably 4 or more, and still even more preferably 10 or more, from the viewpoint of forming a transparent layer and nashiji patterns. The mass ratio is preferably 200 or less, more preferably 160 or less, even more preferably 150 or less, even more preferably 80 or less, even more preferably 50 or less, even more preferably 40 or less, even more preferably 35 or less, and still even more preferably 20 or less, from the viewpoint of forming a lamellar texture.

(Organic Crystal Nucleating Agent)

In addition, it is preferable that the polylactic acid resin composition of the present invention contains an organic crystal nucleating agent, from the viewpoint of improving crystallization velocity of the polylactic acid resin, thereby improving crystallinity of the polylactic acid resin, making a transparent layer on the surface outstanding, and at the same time improving designability of nashiji patterns and a lamellar texture.

As the organic crystal nucleating agent in the present invention, it is preferable to use one or more members selected from the group consisting of the following (a) to (d):

(a) one or more organic compounds selected from the group consisting of compounds including an isoindolinone backbone, compounds including a diketo-pyrrolo-pyrrole backbone, compounds including a benzimidazolone backbone, compounds including an indigo backbone, compounds including a phthalocyanine backbone, and compounds including a porphyrin backbone [referred to as organic crystal nucleating agent (a)];

(b) one or more organic compounds selected from the group consisting of carbohydrazides, uracils, and N-substituted ureas [referred to as organic crystal nucleating agent (b)];

(c) one or more organic compounds selected from the group consisting of metal salts of dialkyl aromatic sulfonates, metal salts of phosphoric esters, metal salts of phenylphosphonic acids, metal salts of rosin acids, aromatic carboxylic acid amides, and rosin acid amides [referred to as organic crystal nucleating agent (c)]; and (d) one or more organic compounds selected from the group consisting of compounds containing hydroxyl group or groups and amide group or groups in the molecule, and hydroxyfatty acid esters [referred to as organic crystal nucleating agent (d)].

Among these, the organic crystal nucleating agent (c) and the organic crystal nucleating agent (d) are preferred, from the viewpoint of shortening a cooling holding time within a mold.

The organic crystal nucleating agent (c) is preferably a metal salt of phenylphosphonic acid having a phenyl group and a phosphonate group ($-PO(OH)_2$), which may have a substituent, from the above viewpoints. The substituent of a phenyl group includes an alkyl group having from 1 to 10 carbon atoms, an alkoxycarbonyl group of which alkoxy group has from 1 to 10 carbon atoms, and the like. Specific examples of the phenylphosphonic acids include unsubstituted phenylphosphonic acid, methylphenylphosphonic acid, ethylphenylphosphonic acid, propylphenylphosphonic acid, butylphenylphosphonic acid, dimethoxycarbonylphenylphosphonic acid, diethoxycarbonylphenylphosphonic acid, and the like, and the unsubstituted phenylphosphonic acid is preferred.

The metal salts of the phenylphosphonic acid include salts of lithium, sodium, magnesium, aluminum, potassium, calcium, barium, copper, zinc, iron, cobalt, nickel, or the like, and the zinc salt is preferred.

The compound having a hydroxyl group and an amide group in the molecule of the organic crystal nucleating agent (d) is preferably an aliphatic amide having a hydroxyl group, and more preferably an aliphatic acid amide having two or more hydroxyl groups and two or more amide groups in the molecule, from the above viewpoint. Specific examples include hydroxyfatty acid monoamides such as 12-hydroxystearic acid monoethanolamide; hydroxyfatty acid bisamides, such as methylenebis 12-hydroxystearic acid amide, ethylenebis 12-hydroxystearic acid amide, and hexamethylenebis 12-hydroxystearic acid amide; and the like.

In addition, the hydroxyfatty acid esters of the organic crystal nucleating agent (d) are preferably hydroxyfatty acid esters of which fatty acid has from 12 to 22 carbon atoms, and more preferably hydroxyfatty acid esters having two or more hydroxyl groups and two or more ester groups in the molecule. Specific examples include hydroxyfatty acid esters such as 12-hydroxystearic acid triglyceride, 12-hydroxystearic acid diglyceride, 12-hydroxystearic acid monoglyceride, pentaerythritol-mono-12-hydroxystearate, pentaerythritol-di-12-hydroxystearate, and pentaerythritol-tri-12-hydroxystearate.

These may be used alone or in combination of two or more kinds. Among them, from the viewpoint of shortening cooling holding time within a mold, one or more members selected from the group consisting of hydroxyfatty acid bisamides and metal salts of phenylphosphonic acids are preferred, and ethylenebis 12-hydroxystearic acid amide and metal salts of unsubstituted phenylphosphonic acid are more preferred.

In addition, the mass ratio of the hydroxyfatty acid bisamide to the metal salt of phenylphosphonic acid (hydroxyfatty acid bisamide/metal salt of phenylphosphonic acid) is preferably 0.2 or more, more preferably 0.3 or more, and even more preferably 0.5 or more, from the viewpoint of increasing crystallization velocity of the polylactic acid resin, thereby making a transparent layer outstanding, and increasing designability of nashiji patterns and a lamellar texture, and from the viewpoint of improving heat resistance of a molded article made of the polylactic acid resin composition. The mass ratio is preferably 6 or less, more preferably 4 or less, and even more preferably 2 or less, from the same viewpoints. In addition, the mass ratio is preferably from 0.2 to 6, more preferably from 0.3 to 4, and even more preferably from 0.5 to 2, from the same viewpoints.

The content of the organic crystal nucleating agent is preferably 0.1 parts by mass or more, more preferably 0.5 parts by mass or more, and even more preferably 0.7 parts by mass or more, and the content is preferably 5 parts by mass or less, more preferably 3 parts by mass or less, and even more preferably 2 parts by mass or less, based on 100 parts by mass of the polylactic acid resin, from the viewpoint of increasing crystallization velocity of the polylactic acid resin, thereby making a transparent layer outstanding, and increasing designability of nashiji patterns and a lamellar texture, and from the viewpoint of shortening a cooling holding time within a mold capable of demolding without deformation. In addition, the content is preferably from 0.1 to 5 parts by mass, more preferably from 0.5 to 3 parts by mass, even more preferably from 0.7 to 3 parts by mass, and still even more preferably from 0.7 to 2 parts by mass. The content of the organic crystal nucleating agent as used herein means a total amount of all the organic crystal nuclear agents contained in the polylactic acid resin composition.

(Plasticizer)

In addition, it is preferable that the polylactic acid resin composition of the present invention further contains, in addition to the components mentioned above, a plasticizer. By blending a plasticizer, the plasticity of the polylactic acid resin is enhanced, thereby improving crystallinity, and making a transparent layer outstanding, whereby designability of nashiji patterns and a lamellar texture can be improved.

The plasticizer includes preferably one or more members selected from the group consisting of polyester-based plasticizers, polyhydric alcohol ester-based plasticizers, polycarboxylic acid ester-based plasticizers, and phosphoric ester-based plasticizers, from the viewpoint of enhancing plasticity of the polylactic acid resin, thereby improving crystallinity, making a transparent layer outstanding, and improving designability of nashiji patterns and a lamellar texture.

Specific examples of the polyester-based plasticizers include polyesters obtained from dicarboxylic acids having preferably from 2 to 12 carbon atoms, and more preferably from 2 to 6 carbon atoms, and di-alcohol having preferably from 2 to 12 carbon atoms, and more preferably from 2 to 6 carbon atoms, or a (poly)oxyalkylene adduct thereof. The dicarboxylic acids include succinic acid, adipic acid, sebacic acid, terephthalic acid, isophthalic acid, and the like. The di-alcohols include propylene glycol, 1,3-butanediol, 1,4-butanediol, 1,6-hexanediol, ethylene glycol, diethylene glycol, triethylene glycol, and the like. In addition, a hydroxyl group or a carboxy group of a polyester terminal may be esterified with a monocarboxylic acid or a mono-alcohol to be capped.

Specific examples of the polyhydric alcohol ester-based plasticizers include mono-, di- or triesters obtained from polyhydric alcohols or (poly)oxyalkylene adducts thereof, and monocarboxylic acids having preferably from 1 to 12 carbon atoms, more preferably from 1 to 6 carbon atoms, and even more preferably from 1 to 4 carbon atoms. The polyhydric alcohols include polyethylene glycol, polypropylene glycol, glycerol, the above-mentioned di-alcohols, and the like. The monocarboxylic acids include acetic acid, propionic acid, and the like.

The polycarboxylic acid ester-based plasticizers include mono-, di- or triesters obtained from polycarboxylic acids, and mono-alcohols having preferably from 1 to 12 carbon atoms, more preferably from 1 to 6 carbon atoms, and even more preferably from 1 to 4 carbon atoms, or (poly)oxyalkylene adducts thereof. The polycarboxylic acids include trimellitic acid, the above-mentioned dicarboxylic acids, and the like. The mono-alcohols include methanol, ethanol, 1-propanol, and 1-butanol, and the like. Specific examples include phthalate esters such as dimethyl phthalate, diethyl phthalate, dibutyl phthalate, dioctyl phthalate, diheptyl phthalate, dibenzyl phthalate, and butylbenzyl phthalate; trimellitate esters such as tributyl trimellitate, trioctyl trimellitate, and trihexyl trimellitate; adipate esters such as diisodecyl adipate and octyldecyl adipate; citrate esters such as triethyl acetyl citrate and tributyl acetyl citrate; azelaate esters such as di-2-ethylhexyl azelaate; sebacate esters such as dibutyl sebacate and di-2-ethylhexyl sebacate; esters obtained from succinic acid and a polyethylene glycol monomethyl ether of ethylene oxide having an average number of moles added of from 2 to 3 (ethylene oxide being added in an amount of from 2 to 3 mol per one hydroxyl group), and the like.

The phosphoric ester-based plasticizers include mono-, di-, or triesters obtained from phosphoric acid and the above-mentioned mono-alcohol or a (poly)oxyalkylene adduct thereof. Specific examples include tributyl phosphate, tri-2-ethylhexyl phosphate, trioctyl phosphate, triphenyl phosphate, diphenyl-2-ethylhexyl phosphate, tricresyl phosphate, tris(ethoxyethoxyethyl) phosphate, and the like.

In addition, as the plasticizers, ester compounds having a (poly)oxyalkylene group or an alkylene group having from 2 to 6 carbon atoms, and ether compounds having a (poly)oxyalkylene group or an alkylene group having from 2 to 6 carbon atoms are preferred, from the viewpoint of making a transparent layer outstanding and improving designability of nashiji patterns and a lamellar texture. Specifically, the ester compounds having a (poly)oxyalkylene group or an alkylene group having from 2 to 6 carbon atoms, and/or ether compounds having a (poly)oxyalkylene group or an alkylene group having from 2 to 6 carbon atoms are preferred. Among them, from the viewpoint of affinity with the polylactic acid resin, the ester compounds having a (poly)oxyalkylene group or an alkylene group having from 2 to 6 carbon atoms are more preferred, and one or more members selected from the group consisting of polyester-based plasticizers, polyhydric alcohol ester-based plasticizers, polycarboxylic acid ester-based plasticizers, and phosphoric ester-based plasticizers, each having a (poly)oxyalkylene group or an alkylene group having from 2 to 6 carbon atoms, are even more preferred. Here, the (poly)oxyalkylene group means an oxyalkylene group or a polyoxyalkylene group. The oxyalkylene group is preferably an oxyethylene group, an oxypropylene group, or an oxybutylene group, and more preferably an oxyethylene group or an oxypropylene group.

Specifically, one or more members selected from the group consisting of the following Compound Groups (A) to (C) are preferred, and when two or more kinds are used in combination, the compounds may belong to the same Compound Group, or different Compound Groups. Compound Group (A): an ester compound containing two or more ester groups in the molecule, wherein at least one kind of the alcohol component constituting the ester compound is an alcohol reacted with an alkylene oxide having from 2 to 3 carbon atoms in an amount of from 0.5 to 5 mol on average, per one hydroxyl group;

Compound Group (B): a compound represented by the formula (I):

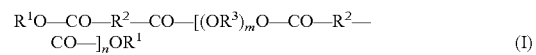

wherein $R^1$ is an alkyl group having from 1 to 4 carbon atoms; $R^2$ is an alkylene group having from 2 to 4 carbon atoms; $R^3$ is an alkylene group having from 2 to 6 carbon atoms, m is the number of from 1 to 6, and n is the number of from 1 to 12, with proviso that all of $R^2$'s may be identical or different, and that all of $R^3$'s may be identical or different; and Compound Group (C): a compound represented by formula (II):

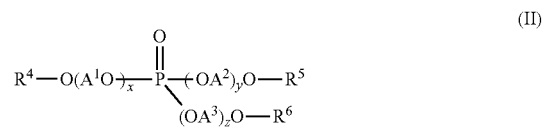

wherein each of $R^4$, $R^5$, and $R^6$ is independently an alkyl group having from 1 to 4 carbon atoms; each of $A^1$, $A^2$, and $A^3$ is independently an alkylene group having 2 or 3 carbon atoms; and each of x, y, and z is independently a positive number showing the average number of moles of an oxyalkylene group added, wherein x+y+z satisfies a number of exceeding 3 and 12 or less.

Compound Group (A)

The ester compound included in Compound Group (A) is an ester compound containing two or more ester groups in the molecule, the ester compound is preferably a compound wherein at least one kind of the alcohol component constituting the ester compound is an alcohol reacted with (or having) an alkylene oxide having from 2 to 3 carbon atoms in an amount of from 0.5 to 5 mol on average, per one hydroxyl group, and more preferably a polyhydric alcohol ester or a polycarboxylic acid ether ester containing two or more ester groups in the molecule, wherein at least one kind of the alcohol component constituting the ester compound is an alcohol reacted with an alkylene oxide having from 2 to 3 carbon atoms in an amount of from 0.5 to 5 mol on average, per one hydroxyl group.

Specific compounds are preferably:

esters obtained from acetic acid and an adduct of glycerol reacted with ethylene oxide in an amount of from 3 to 6 mol on average (reacted with ethylene oxide in an amount of from 1 to 2 mol per one hydroxyl group); esters obtained from acetic acid and an adduct of polyethylene glycol reacted with ethylene oxide in an amount of from 4 to 6 mol on average;

esters obtained from succinic acid and a polyethylene glycol monomethyl ether reacted with ethylene oxide in an amount of from 2 to 3 mol on average (reacted with ethylene oxide in an amount of from 2 to 3 mol per one hydroxyl group);

esters obtained from adipic acid and diethylene glycol monomethyl ether; and esters obtained from 1,3,6-hexanetricarboxylic acid and diethylene glycol monomethyl ether.

Compound Group (B)

$R^1$ in the formula (I) is an alkyl group having from 1 to 4 carbon atoms, and two of them are present in one molecule, both at the terminals of the molecule. If $R^1$ has from 1 to 4 carbon atoms, it may be linear or branched. The number of carbon atoms of the alkyl group is preferably from 1 to 4, and more preferably from 1 to 2, from the viewpoint of making a transparent layer outstanding, and improving designability of nashiji patterns and a lamellar texture. Specific examples include a methyl group, an ethyl group, a propyl group, an isopropyl group, a butyl group, a sec-butyl group, a tert-butyl group, and an iso-butyl group, among which a methyl group and an ethyl group are preferred, and a methyl group is more preferred.

$R^2$ in the formula (I) is an alkylene group having from 2 to 4 carbon atoms, and includes linear alkylene groups as preferred examples. Specific examples include an ethylene group, a 1,3-propylene group, and a 1,4-butylene group. An ethylene group, a 1,3-propylene group, and a 1,4-butylene group are preferred, and an ethylene group is more preferred, from the viewpoint of making a transparent layer outstanding, and improving designability of nashiji patterns and a lamellar texture. Here, all the $R^2$'s may be identical or different.

$R^3$ in the formula (I) is an alkylene group having from 2 to 6 carbon atoms, and $OR^3$ exists in the repeating unit as an oxyalkylene group. $R^3$ may be linear or branched so long as the alkylene group has from 2 to 6 carbon atoms. The number of carbon atoms of the alkylene group is preferably from 2 to 6, and more preferably from 2 to 3, from the viewpoint of making a transparent layer outstanding, and improving designability of nashiji patterns and a lamellar texture. Specific examples include an ethylene group, a 1,2-propylene group, a 1,3-propylene group, a 1,2-butylene group, a 1,3-butylene group, a 1,4-butylene group, a 2-methyl-1,3-propylene group, a 1,2-pentylene group, a 1,4-pentylene group, a 1,5-pentylene group, a 2,2-dimethyl-1,3-propylene group, a 1,2-hexylene group, a 1,5-hexylene group, a 1,6-hexylene group, a 2,5-hexylene group, and a 3-methyl-1,5-pentylene group, among which an ethylene group, a 1,2-propylene group, and a 1,3-propylene group are preferred. Here, all the $R^3$'s may be identical or different.

m is an average number of repeats of an oxyalkylene group, and m is preferably the number of from 1 to 6, more preferably the number of from 1 to 4, and even more preferably from the number of from 1 to 3, from the viewpoint of heat resistance.

n is an average number of repeats of repeating units, i.e. an average degree of polymerization, and n is the number of from 1 to 12. n is preferably the number of from 1 to 12, more preferably the number of from 1 to 6, and even more preferably the number of from 1 to 5, from the viewpoint of making a transparent layer outstanding, and improving designability of nashiji patterns and a lamellar texture. The average degree of polymerization may be obtained by an analysis by NMR or the like, but the average degree of polymerization can be calculated in accordance with the method described in Examples set forth below.

Specific examples of the compound represented by the formula (I) are preferably compounds in which all the $R^1$'s are methyl groups, $R^2$ is an ethylene group or a 1,4-butylene group, $R^3$ is an ethylene group or a 1,3-propylene group, m is the number of from 1 to 4, and n is the number of from 1 to 6, and more preferably compounds in which all the $R^1$'s are methyl groups, $R^2$ is an ethylene group or a 1,4-butylene group, $R^3$ is an ethylene group or a 1,3-propylene group, m is the number of from 1 to 3, and n is the number of from 1 to 5.

The compound represented by the formula (I) is not particularly limited so long as the compound has the structure mentioned above, and those obtained using the following raw materials (1) to (3) are preferred. Here, (1) and (2), or (2) and (3) may form ester compounds. (2) may be an acid anhydride or an acid halide.

(1) Monohydric Alcohol Containing Alkyl Group Having from 1 to 4 Carbon Atoms (2) Dicarboxylic Acid Containing Alkylene Group Having from 2 to 4 Carbon Atoms (3) Dihydric Alcohol Containing Alkylene Group Having from 2 to 6 Carbon Atoms (1) Monohydric Alcohol Containing Alkyl Group Having from 1 to 4 Carbon Atoms The monohydric alcohol containing an alkyl group having from 1 to 4 carbon atoms is an alcohol including $R^1$ as defined above, and specific examples include methanol, ethanol, 1-propanol, 2-propanol, 1-butanol, 2-butanol, 2-methyl-l-propanol, and 1,1-dimethyl-1-ethanol. Among them, methanol, ethanol, 1-propanol, and 1-butanol are preferred, methanol and ethanol are more preferred, and methanol is even more preferred, from the viewpoint of making a transparent layer outstanding, and improving designability of nashiji patterns and a lamellar texture.

(2) Dicarboxylic Acid Containing Alkylene Group Having from 2 to 4 Carbon Atoms

The dicarboxylic acid containing an alkylene group having from 2 to 4 carbon atoms is a dicarboxylic acid including $R^2$ as defined above, and specific examples include succinic acid, glutaric acid, adipic acid, and derivatives thereof, e.g. succinic anhydride, glutaric anhydride, dimethyl succinate, dibutyl succinate, dimethyl glutarate, dimethyl adipate, and the like. Among them, succinic acid, adipic acid and derivatives thereof, e.g. succinic anhydride, dimethyl succinate, dibutyl succinate, and dimethyl adipate, are preferred, and succinic acid and derivatives thereof, e.g. succinic anhydride, dimethyl succinate, and dibutyl succinate, are more preferred, from the viewpoint of making a transparent layer outstanding, and improving designability of nashiji patterns and a lamellar texture.

(3) Dihydric Alcohol Containing Alkylene Group Having from 2 to 6 Carbon Atoms

The dihydric alcohol containing an alkylene group having from 2 to 6 carbon atoms is a dihydric alcohol including $R^3$ as defined above, and specific examples include ethylene glycol, diethylene glycol, triethylene glycol, tetraethylene glycol, 1,2-propanediol, 1,3-propanediol, 2-methyl-1,3-propanediol, 2,2-dimethyl-1,3-propanediol, 1,2-butanediol, 1,3-butanediol, 1,4-butanediol, 1,2-pentanediol, 1,4-pentanediol, 1,5-pentanediol, 2,5-hexanediol, 1,6-hexanediol, and 3-methyl-1,5-pentanediol. Among them, diethylene glycol, triethylene glycol, 1,2-propanediol, 1,3-propanediol, tetraethylene glycol, and 1,4-butanediol are preferred, diethylene glycol, triethylene glycol, 1,2-propanediol, and 1,3-propanediol are more preferred, and diethylene glycol, triethylene glycol, and 1,3-propanediol are even more preferred, from the viewpoint of making a transparent layer outstanding, and improving designability of nashiji patterns and a lamellar texture.

Accordingly, as the above (1) to (3), it is preferable that (1) the monohydric alcohol is one or more members selected from the group consisting of methanol, ethanol, 1-propanol, and 1-butanol, that (2) the dicarboxylic acid is one or more members selected from the group consisting of succinic acid, adipic acid, glutaric acid, and derivatives thereof, and that (3) the dihydric alcohol is one or more members selected from the group consisting of diethylene glycol, triethylene glycol, 1,2-propanediol, 1,3-propanediol, tetraethylene glycol, and 1,4-butanediol;

it is more preferable that (1) the monohydric alcohol is one or more members selected from the group consisting of methanol and ethanol, that (2) the dicarboxylic acid is one or more members selected from the group consisting of succinic acid, adipic acid, and derivatives thereof, and that (3) the dihydric alcohol is one or more members selected from the group consisting of diethylene glycol, triethylene glycol, 1,2-propanediol, and 1,3-propanediol; and it is even more preferable that (1) the monohydric alcohol is methanol, that (2) the dicarboxylic acid is one or more members selected from the group consisting of succinic acid and derivatives thereof, and that (3) the dihydric alcohol is one or more members selected from the group consisting of diethylene glycol, triethylene glycol, and 1,3-propanediol.

The method for obtaining an ester compound represented by the formula (I) by using the above (1) to (3) is not particularly limited, and the method includes, for example, the methods of the following Embodiment 1 and Embodiment 2:

Embodiment 1: a method including the steps of carrying out an esterification reaction between (2) the dicarboxylic acid and (1) the monohydric alcohol to synthesize a dicarboxylic acid ester; and carrying out an esterification reaction between the dicarboxylic acid ester obtained and (3) the dihydric alcohol; and Embodiment 2: a method including the step of allowing to react (1) the monohydric alcohol, (2) the dicarboxylic acid, and (3) the dihydric alcohol at one time.

Among these methods, the method of Embodiment 1 is preferred, from the viewpoint of adjusting an average degree of polymerization. Here, the reactions of each of the steps mentioned above can be carried out in accordance with a known method.

The acid value of the compound represented by the formula (I) is preferably 1.50 mgKOH/g or less, and more preferably 1.00 mgKOH/g or less, from the viewpoint of making a transparent layer outstanding, and improving designability of nashiji patterns and a lamellar texture, and the hydroxyl value is preferably 10.0 mgKOH/g or less, more preferably 5.0 mgKOH/g or less, and even more preferably 3.0 mgKOH/g or less, from the viewpoint of making a transparent layer outstanding, and improving designability of nashiji patterns and a lamellar texture. The acid value and the hydroxyl value of the plasticizer as used herein can be measured in accordance with the methods described in Examples set forth below.

In addition, the number-average molecular weight of the compound represented by the formula (I) is preferably from 300 to 1,500, and more preferably from 300 to 1,000, from the viewpoint of making a transparent layer outstanding, and improving designability of nashiji patterns and a lamellar texture. The number-average molecular weight of the plasticizer as used herein can be calculated in accordance with the method described in Examples set forth below.

The saponification value of the compound represented by the formula (I) is preferably from 500 to 800 mgKOH/g, and more preferably from 550 to 750 mgKOH/g, from the viewpoint of making a transparent layer outstanding, and improving designability of nashiji patterns and a lamellar texture. The saponification value of the plasticizer as used herein can be measured in accordance with the method described in Examples set forth below.

The alkyl esterification percentage based on the two molecular terminals (terminal alkyl esterification percentage) of the compound represented by the formula (I) is preferably 95% or more, and more preferably 98% or more, from the viewpoint of making a transparent layer outstanding, and improving designability of nashiji patterns and a lamellar texture. The terminal alkyl esterification percentage of the plasticizer as used herein can be calculated in accordance with the method described in Examples set forth below.

The ether group value of the compound represented by the formula (I) is preferably from 0 to 8 mmol/g, and more preferably from 0 to 6 mmol/g, from the viewpoint of making a transparent layer outstanding, and improving designability of nashiji patterns and a lamellar texture. The ether group value of the plasticizer as used herein can be calculated in accordance with the method described in Examples set forth below.

Compound Group (C)

The compound represented by the formula (II) is a polyether-form phosphoric triester, which may take a symmetric structure or an asymmetric structure, and the phosphoric triester having a symmetric structure is preferred, from the viewpoint of simplicity in the production.

Each of $R^4$, $R^5$, and $R^6$ is independently an alkyl group having from 1 to 4 carbon atoms, which may be linear or branched. Specific examples include a methyl group, an ethyl group, a propyl group, an isopropyl group, a butyl group, and an isobutyl group, and an ethyl group, a propyl group, or a butyl group is preferred. In addition, an alkyl group having from 2 to 3 carbon atoms, i.e. an ethyl group or a propyl group, is more preferred, from the viewpoint of making a transparent layer outstanding, and improving designability of nashiji patterns and a lamellar texture.

Each of $A^1$, $A^2$, and $A^3$ is independently an alkylene group having 2 or 3 carbon atoms, which may be linear or branched. Specific examples include an ethylene group, an n-propylene group, and an isopropylene group, among which an ethylene group is preferred, from the viewpoint of making a transparent layer outstanding, and improving designability of nashiji patterns and a lamellar texture. Also, $A^1$, $A^2$, and $A^3$ form oxyalkylene groups, i.e. alkylene oxides, with an adjoining oxygen atom to form a repeating structure in the compound represented by the formula (II).

Each of x, y, and z is independently a positive number showing the number of average moles of oxyalkylene groups added, wherein x+y+z satisfies the number that exceeds 3 and is equal to or less than 12. Among them, x, y, and z are positive numbers, wherein x+y+z satisfies preferably the number that exceeds 3 and is less than 12, more preferably the number that exceeds 4 and is less than 12, and even more preferably the number of equal to or greater than 6 and equal to or less than 9, from the viewpoint of making a transparent layer outstanding, and improving designability of nashiji patterns and a lamellar texture.

Accordingly, the compound represented by the formula (II) is (1) preferably a compound where each of $R^4$, $R^5$, and $R^6$ is independently an alkyl group having from 1 to 4 carbon atoms; each of $A^1$, $A^2$, and $A^3$ is independently an alkylene group having 2 or 3 carbon atoms; and each of x, y, and z is independently a positive number showing the number of average moles of oxyalkylene groups added, wherein x+y+z satisfies the number that exceeds 3 and is equal to or less than 12, (2) more preferably a compound where each of $R^4$, $R^5$, and $R^6$ is independently an alkyl group having from 1 to 4 carbon atoms; all of $A^1$'s, $A^2$'s, and $A^3$'s are an ethylene group; and x, y, and z are positive numbers, wherein x+y+z satisfies the number that exceeds 4 and is less than 12, and (3) even more preferably a compound where each of $R^4$, $R^5$, and $R^6$ is independently an alkyl group having from 1 to 4 carbon atoms; all of $A^1$'s, $A^2$'s, and $A^3$'s are an ethylene group; and x, y, and z are positive numbers, wherein x+y+z satisfies the number that is equal to or greater than 6 and equal to or less than 9.

Specific examples of the compound represented by the formula (II) include symmetric polyether-form phosphoric triesters such as tris(ethoxyethoxyethyl) phosphate, wherein in the formula (II) all of $R^4$'s, $R^5$'s, and $R^6$'s are ethyl groups, all of $A^1$'s, $A^2$'s, and $A^3$'s are ethylene groups, all of x, y, and z are 2, and x+y+z=6,
tris(methoxyethoxyethyl) phosphate, x+y+z=6,
tris(propoxyethoxyethyl) phosphate, x+y+z=6,
tris(butoxyethoxyethyl) phosphate, x+y+z=6,
tris(methoxyethoxyethoxyethyl) phosphate, x+y+z=9,
tris(ethoxyethoxyethoxyethyl) phosphate, x+y+z=9, and
tris(propoxyethoxyethoxyethyl) phosphate, x+y+z=9; and asymmetric polyether-form phosphoric triesters such as bis
(ethoxyethoxyethyl)methoxyethoxyethoxyethyl phosphate, x+y+z=7,
bis(methoxyethoxyethoxyethyl)ethoxyethoxyethyl phosphate, x+y+z=8, and
bis(ethoxyethoxyethyl)-{butoxyethoxyethyl}phosphate, x+y+z=6; or
an asymmetric polyether-form phosphoric ester obtained by triester-phosphorylating a mixture of a polyoxyethylene adduct or polyoxypropylene adduct of an alcohol having from 1 to 4 carbon atoms so as to satisfy the formula (II). Tris(ethoxyethoxyethyl) phosphate, tris(propoxyethoxyethyl) phosphate, tris(ethoxyethoxyethoxyethyl) phosphate, or tris(propoxyethoxyethoxyethyl) phosphate is preferred, and tris(ethoxyethoxyethyl) phosphate is more preferred, from the viewpoint of making a transparent layer outstanding, and improving designability of nashiji patterns and a lamellar texture.

Preferably the content of one or more members selected from the group consisting of polyester-based plasticizers, polyhydric alcohol ester-based plasticizers, polycarboxylic acid ester-based plasticizers, and phosphoric ester-based plasticizers, or the content of the ester compound and/or the ether compound having a (poly)oxyalkylene group or an alkylene group having from 2 to 6 carbon atoms, more preferably the content of one or more members selected from the group consisting of polyester-based plasticizers, polyhydric alcohol ester-based plasticizers, polycarboxylic acid ester-based plasticizers, and phosphoric ester-based plasticizers, each having a (poly)oxyalkylene group or an alkylene group having from 2 to 6 carbon atoms, and even more preferably the content of one or more compounds selected from the group consisting of Compound Groups (A) to (C) mentioned above, is preferably 50% by mass or more, more preferably 80% by mass or more, even more preferably 90% by mass or more, and even more preferably substantially 100% by mass, of the plasticizer, from the viewpoint of making a transparent layer outstanding, and improving designability of nashiji patterns and a lamellar texture. The above-mentioned content of the plasticizer as used herein means a total content when plural compounds are contained.

The content of the plasticizer, based on 100 parts by mass of the polylactic acid resin, is preferably 0.1 parts by mass or more, more preferably 1 part by mass or more, even more preferably 3 parts by mass or more, even more preferably 5 parts by mass or more, even more preferably 6 parts by mass or more, and still even more preferably 8 parts by mass or more, from the viewpoint of making a transparent layer outstanding, and improving designability of nashiji patterns and a lamellar texture, and the content is preferably 30 parts by mass or less, more preferably 25 parts by mass or less, even more preferably 20 parts by mass or less, even more preferably 18 parts by mass or less, even more preferably 15 parts by mass or less, and still even more preferably 12 parts by mass or less, from the viewpoint of bleeding resistance.

(Hydrolysis Inhibitor)

In addition, the polylactic acid resin composition of the present invention may further properly contain, in addition to the above components, a hydrolysis inhibitor.

The hydrolysis inhibitor includes carbodiimide compounds such as polycarbodiimide compounds and monocarbodiimide compounds, and the polycarbodiimide compounds are preferred, from the viewpoint of improving durability and impact resistance of the polylactic acid resin composition, and from the viewpoint of improving designability of nashiji patterns and a lamellar texture, and the monocarbodiimide compounds are preferred, from the viewpoint of improving durability and moldability (fluidity) of the polylactic acid resin composition, and from the viewpoint of improving designability of nashiji patterns and a lamellar texture. In addition, it is preferable that the monocarbodiimide and the polycarbodiimide are used together, from the viewpoint of even more improving durability, impact resistance, and moldability of the molded article made of the polylactic acid resin composition, and from the viewpoint of improving designability of nashiji patterns and a lamellar texture.

The polycarbodiimide compound includes poly(4,4'-diphenylmethanecarbodiimide), poly(4,4'-dicyclohexylmethanecarbodiimide), poly(1,3,5-triisopropylbenzene)polycarbodiimide, poly(1,3,5-triisopropylbenzene and 1,3-diisopropylbenzene)polycarbodiimide, and the like. The monocarbodiimide compound includes N,N'-di-2,6-diisopropylphenylcarbodiimide, and the like.

In order to satisfy durability, impact resistance, moldability, and designability of the molded article made of the polylactic acid resin composition, the above-mentioned carbodiimide compounds may be used alone or in a combination of two or more kinds. In addition, as the poly(4,4'-dicyclohexylmethanecarbodiimide), Carbodilite LA-1 manufactured by Nisshinbo Chemical Inc. can be purchased and used; as the poly(1,3,5-triisopropylbenzene)polycarbodiimide and poly(1,3,5-triisopropylbenzene and 1,3-diisopropylbenzene)polycarbodiimide, Stabaxol P and Stabaxol P-100, manufactured by Rhein Chemie Rheinau GmbH can be purchased and used; and as N,N'-di-2,6-diisopropylphenylcarbodiimide, Stabaxol 1 manufactured by Rhein Chemie Rheinau GmbH can be purchased and used, respectively.

The content of the hydrolysis inhibitor is preferably 0.05 parts by mass or more, and more preferably 0.10 parts by mass or more, and even more preferably 1 part by mass or more, and preferably 10 parts by mass or less, more preferably 5 parts by mass or less, and even more preferably 4 parts by mass or less, based on 100 parts by mass of the polylactic acid resin, from the viewpoint of improving transparency, moldability, and designability of the molded article made of the polylactic acid resin composition.

The polylactic acid resin composition of the present invention can contain, as other components besides those mentioned above, a filler other than glass fibers, including an inorganic filler and an organic filler, a flame retardant, an antioxidant, a lubricant such as a hydrocarbon wax or an anionic surfactant, an ultraviolet absorbent, an antistatic agent, an anti-clouding agent, a photostabilizer, a pigment other than the metallic pigment, a mildewproof agent, a bactericidal agent, a blowing agent or the like, within the range that would not impair the effects of the present invention. In addition, similarly, other polymeric materials and other resin compositions can be included within the range that would not impair the effects of the present invention.

The polylactic acid resin composition of the present invention can be prepared without particular limitations, so long as the polylactic acid resin composition contains a polylactic acid resin, glass fibers having an average aspect ratio (average fiber length/average fiber diameter) of 5 or more, and a metallic pigment in amounts such that the glass fibers are contained in an amount of from 2 to 35 parts by mass, and the metallic pigment is contained in an amount of from 0.1 to 8 parts by mass, based on 100 parts by mass of the polylactic acid resin. For example, the polylactic acid resin composition can be prepared by melt-kneading raw materials containing a polylactic acid resin, glass fibers, and a metallic pigment, and further optionally various components with a known kneader such as a closed kneader, a single-screw or twin-screw extruder, or an open-roller type kneader. During the melt-kneading, a melt-kneaded product containing a metallic pigment and a melt-kneaded product containing glass fibers may be separately prepared, and then mixed together and melt-kneaded. After the melt-kneading, the melt-kneaded product may be dried or cooled in accordance with a known method. Also, it is possible to previously homogeneously mix the raw materials with a Henschel mixer, Super mixer or the like, and then subject the mixture to melt-kneading. Here, during the melt-kneading, the mixture may be mixed in a molten state in the presence of a supercritical gas in order to accelerate plasticity of the polylactic acid resin.

The melt-kneading temperature is preferably 160° C. or higher, more preferably 165° C. or higher, and even more preferably 170° C. or higher, and preferably 250° C. or lower, more preferably 230° C. or lower, and even more preferably 200° C. or lower, from the viewpoint of improving moldability and degradation prevention of the polylactic acid resin composition. Also, the melt-kneading temperature is preferably from 160° to 250° C., more preferably from 165° to 230° C., and even more preferably from 170° to 200° C. The melt-kneading time cannot be unconditionally determined because the melt-kneading time depends upon the melt-kneading temperature and the kinds of the kneaders, and the melt-kneading time is preferably from 15 to 900 seconds.

The polylactic acid resin composition of the present invention thus obtained has excellent workability (moldability) and excellent transparency, so that it is made possible to use the polylactic acid resin composition under high-temperature conditions, whereby the polylactic acid resin composition can be suitably used in various kinds of applications, especially industrial manufactured articles having excellent designability.

<Polylactic Acid Resin Molded Article>

The present invention also provides an injection-molded article made of the above-mentioned polylactic acid resin composition (also simply referred to as polylactic acid resin molded article). The injection-molded article is not particularly limited, so long as the above-mentioned polylactic acid resin composition is subjected to injection molding, which is obtained, for example, by filling pellets of the above-mentioned polylactic acid resin composition in an injection-molding machine, and injecting the pellets in a mold to mold.

In the injection molding, a known injection-molding machine can be used, including, for example, a machine comprising a cylinder and a screw inserted through an internal thereof as main constituting elements, e.g. J75E-D, manufactured by The Japan Steel Works, Ltd. or the like. Here, although the raw materials for the above-mentioned polylactic acid resin composition may be supplied to a cylinder and directly melt-kneaded, it is preferable that a product previously melt-kneaded is filled in an injection-molding machine.

The set temperature of the cylinder is preferably from 180° to 220° C., and more preferably from 180° to 210° C. When the melt-kneader is used, the set temperature means the set temperature of the cylinder of the kneader during melt-kneading. Here, the cylinder comprises some heaters, by which temperature control is carried out. The number of heaters depends on the kinds of machines so that the number cannot be unconditionally determined, and the heaters controlled to the above-mentioned set temperature have a temperature at the discharge outlet side of the melt-kneaded product, i.e. the side of tip end of nozzle.

The mold temperature is preferably 110° C. or lower, more preferably 90° C. or lower, and even more preferably 80° C. or lower, from the viewpoint of production costs. The mold temperature is preferably 30° C. or higher, more preferably 40° C. or higher, and even more preferably 60° C. or higher, from the viewpoint of improvement in designability and improvement in operability due to the improvement in the crystallization velocity of the polylactic acid resin composition. From the above viewpoints, the mold temperature is preferably from 30° to 110° C., more preferably from 40° to 90° C., and even more preferably from 60° to 80° C. Since the polylactic acid resin composition of the present invention has excellent crystallization velocity and is capable of being mold-processable at low temperatures, a molded article having sufficient heat resistance can be obtained even at the molding temperature mentioned above.

The holding time inside the mold cannot be unconditionally determined because the holding time differs depending upon the temperature of the mold. The holding time is preferably from 20 to 90 seconds, more preferably from 20 to 80 seconds, and even more preferably from 20 to 60 seconds. In other words, since the polylactic acid resin composition of the present invention has a high crystallization velocity, a molded article made of the polylactic acid resin composition which has sufficient heat resistance even at a holding time as short as defined above is obtained.

The injection-molded article of the present invention is provided with high designability having a lamellar texture in the nashiji patterns because the moldability of the above-mentioned polylactic acid resin composition is excellent and the distribution of the glass fibers and the metallic pigment is excellent. The high designability as mentioned above is caused by flow resistance during injection molding, which is thought to be exhibited by the glass fibers having large flow resistance flowing near the central part of the injection flow, the metallic pigment having small flow resistance flowing an outer side thereof, and formation of layers of the polylactic acid resin in an outer side thereof Accordingly, nashiji (also referred to as grained) patterns are exhibited by the glass fibers in the internal of the molded article, and a lamellar texture (also referred to as gloss) is exhibited by a metallic pigment concentrated near the surface part thereof, and further the polylactic acid resin on the surface is contacted with the mold to cool and inhibit crystal formations, thereby forming a transparent layer. On the other hand, the crystallization progresses in the internal polylactic acid resin, thereby becoming opaque.

The present invention also provides a method for producing an injection-molded article of the present invention.

The production method is not particularly limited, so long as the method includes the step of injection-molding a polylactic acid resin composition of the present invention, and steps can be appropriately added, in accordance with the kinds of the molded articles obtained.

Specifically, the method includes embodiments including the following steps.

step (1): melt-kneading raw materials for a polylactic acid resin composition containing a polylactic acid resin, glass fibers, and a metallic pigment, wherein the glass fibers having an average aspect ratio (average fiber length/average fiber diameter) of 5 or more are contained in an amount of from 2 to 35 parts by mass, and the metallic pigment is contained in an amount of from 0.1 to 8 parts by mass, based on 100 parts by mass of the polylactic acid resin, to prepare a melt-kneaded product of the polylactic acid resin composition; and step (2): injection-molding the melt-kneaded product of the polylactic acid resin composition obtained in the step (1) in a mold.

The step (1) is the step to prepare a melt-kneaded product of the polylactic acid resin composition. Specifically, the melt-kneaded product can be prepared by melt-kneading raw materials including a polylactic acid resin, glass fibers having an average aspect ratio (average fiber length/average fiber diameter) of 5 or more, and a metallic pigment, wherein the glass fibers having an average aspect ratio (average fiber length/average fiber diameter) of 5 or more are contained in an amount of from 2 to 35 parts by mass, and the metallic pigment is contained in an amount of from 0.1 to 8 parts by mass, based on 100 parts by mass of the polylactic acid resin, at a temperature of preferably from 160° to 250° C., more preferably from 165° to 230° C., and even more preferably from 170° to 200° C.

The step (2) is the step of injection-molding the melt-kneaded product of the polylactic acid resin composition. Specifically, the melt-kneaded product obtained in the step (1) can be molded by filling the melt-kneaded product in an injection-molding machine equipped with a cylinder heated to a temperature of preferably from 180° to 220° C., and more preferably from 180° to 210° C., and injecting in a mold at a temperature of preferably from 30° to 110° C., more preferably from 40° to 90° C., and even more preferably from 60° to 80° C.

Since the injection-molded article of the present invention thus obtained is provided with high designability having a lamellar texture in the nashiji patterns, the injection-molded article can be suitably used in industrial manufactured articles having excellent designability, for example, daily sundries, household electric appliance parts, and automobile parts.

With respect to the above-mentioned embodiments, the present invention further discloses the following polylactic acid resin composition, the molded article of the composition, and the method for producing the molded article.

<1> a polylactic acid resin composition containing a polylactic acid resin, glass fibers having an average aspect ratio (average fiber length/average fiber diameter) of 5 or more, and a metallic pigment, wherein the glass fibers are contained in an amount of from 2 to 35 parts by mass, and the metallic pigment is contained in an amount of from 0.1 to 8 parts by mass, based on 100 parts by mass of the polylactic acid resin;

<2> the polylactic acid resin composition according to the above <1>, wherein the content of the glass fibers is 2 parts by mass or more, preferably 3 parts by mass or more, more preferably 5 parts by mass or more, even more preferably 8 parts by mass or more, and still even more preferably 12 parts by mass or more, and 35 parts by mass or less, preferably 30 parts by mass or less, more preferably 28 parts by mass or less, even more preferably 24 parts by mass or less, and still even more preferably 18 parts by mass or less, based on 100 parts by mass of the polylactic acid resin;

<3> the polylactic acid resin composition according to the above <1> or <2>, wherein the average fiber length of the glass fibers is preferably 60 μm or more, more preferably 100 μm or more, even more preferably 0.5 mm or more, even more preferably 1 mm or more, and still even more preferably 2 mm or more, and preferably 20 mm or less, more preferably 15 mm or less, even more preferably 10 mm or less, and even more preferably 7 mm or less;

<4> the polylactic acid resin composition according to any one of the above <1> to <3>, wherein the average fiber diameter of the glass fibers is preferably 3 μm or more, more preferably 6 μm or more, and even more preferably 10 μm or more, and preferably 50 μm or less, more preferably 30 μm or less, and even more preferably 20 μm or less;

<5> the polylactic acid resin composition according to any one of the above <1> to <4>, wherein the average aspect ratio of the glass fibers is 5 or more, preferably 10 or more, more preferably 20 or more, even more preferably 50 or more, even more preferably 100 or more, and still even more preferably 180 or more, and preferably 1,500 or less, more preferably 1,000 or less, even more preferably 800 or less, even more preferably 600 or less, and still even more preferably 300 or less;

<6> the polylactic acid resin composition according to any one of the above <1> to <5>, wherein the content of the metallic pigment is 0.1 parts by mass or more, preferably 0.2 parts by mass or more, more preferably 0.5 parts by mass or more, and even more preferably 0.8 parts by mass or more, and 8 parts by mass or less, preferably 6 parts by mass or less, more preferably 4 parts by mass or less, and even more preferably 3 parts by mass or less, based on 100 parts by mass of the polylactic acid resin;

<7> the polylactic acid resin composition according to any one of the above <1> to <6>, wherein the raw materials for the metallic pigment are metal powders and/or metal sulfides;

<8> the polylactic acid resin composition according to any one of the above <1> to <6>, wherein the metallic pigment is a pigment of which raw materials are preferably one or more members selected from the group consisting of aluminum, gold, silver, copper, nickel, titanium, stainless steel, nickel sulfide, cobalt sulfide, and manganese sulfide, and more preferably aluminum pigments;

<9> the polylactic acid resin composition according to any one of the above <1> to <8>, wherein the average particle size of the metallic pigment is preferably 1 μm or more, more preferably 20 μm or more, and even more preferably 40 μm or more, and preferably 500 μm or less, more preferably 100 μm or less, even more preferably 80 μm or less, and still even more preferably 60 μm or less;

<10> the polylactic acid resin composition according to any one of the above <1> to <9>, wherein the mass ratio of the glass fibers to the metallic pigment (glass fibers/metallic pigment) is preferably 1 or more, more preferably 2 or more, even more preferably 4 or more, and still even more preferably 10 or more, and preferably 200 or less, more preferably 150 or less, even more preferably 80 or less, even more preferably 50 or less, even more preferably 40 or less, even more preferably 35 or less, and still even more preferably 20 or less;

<11> the polylactic acid resin composition according to any one of the above <1> to <10>, further containing an organic crystal nucleating agent;

<12> the polylactic acid resin composition according to the above <11>, wherein the organic crystal nucleating agent is one or more members selected from the group consisting of the following (c) to (d):

(c) one or more organic compounds selected from the group consisting of metal salts of dialkyl aromatic sulfonates, metal salts of phosphoric esters, metal salts of phenylphosphonic acids, metal salts of rosin acids, aromatic carboxylic acid amides, and rosin acid amides [referred to as organic crystal nucleating agent (c)]; and (d) one or more organic compounds selected from the group consisting of compounds containing hydroxyl group or groups and amide group or groups in the molecule, and hydroxyfatty acid esters [referred to as organic crystal nucleating agent (d)];

<13> the polylactic acid resin composition according to the above <12>, wherein the organic crystal nucleating agent is preferably one or more members selected from the group consisting of hydroxyfatty acid bisamides and metal salts of phenylphosphonic acids, and more preferably ethylenebis 12-hydroxystearic acid amide and metal salts of phenylphosphonic acid;

<14> the polylactic acid resin composition according to the above <13>, wherein the mass ratio of the hydroxyfatty acid bisamide to the metal salt of phenylphosphonic acid (hydroxyfatty acid bisamide/metal salt of phenylphosphonic acid) is preferably 0.2 or more, more preferably 0.3 or more, and even more preferably 0.5 or more, and preferably 6 or less, more preferably 4 or less, and even more preferably 2 or less;

<15> the polylactic acid resin composition according to any one of the above <11> to <14>, wherein the content of the organic crystal nucleating agent is preferably 0.1 parts by mass or more, more preferably 0.5 parts by mass or more, and even more preferably 0.7 parts by mass or more, and preferably 5 parts by mass or less, more preferably 3 parts by mass or less, and even more preferably 2 parts by mass or less, based on 100 parts by mass of the polylactic acid resin;

<16> the polylactic acid resin composition according to any one of the above <1> to <15>, further containing a plasticizer;

<17> the polylactic acid resin composition according to the above <16>, wherein the plasticizer includes preferably one or more members selected from polyester-based plasticizers, polyhydric alcohol ester-based plasticizers, polycarboxylic acid ester-based plasticizers, and phosphoric ester-based plasticizers;

<18> the polylactic acid resin composition according to the above <16> or <17>, wherein the plasticizer includes preferably one or more members selected from the group consisting of polyester-based plasticizers, polyhydric alcohol ester-based plasticizers, polycarboxylic acid ester-based plasticizers, and phosphoric ester-based plasticizers, or ester compounds and/or ether compounds having a (poly)oxyalkylene group or an alkylene group having from 2 to 6 carbon atoms, and more preferably polyester-based plasticizers, polyhydric alcohol ester-based plasticizers, polycarboxylic acid ester-based plasticizers, and phosphoric ester-based plasticizers, each having a (poly)oxyalkylene group or an alkylene group having from 2 to 6 carbon atoms;

<19> the polylactic acid resin composition according to any one of the above <16> to <18>, wherein the plasticizer contains preferably one or more members selected from the group consisting of:

Compound Group (A) an ester compound containing two or more ester groups in the molecule, wherein at least one kind of the alcohol component constituting the ester compound is an alcohol reacted with an alkylene oxide having from 2 to 3 carbon atoms in an amount of from 0.5 to 5 mol on average, per one hydroxyl group;

Compound Group (B) a compound represented by the formula (I):

$$R^1O\text{—}CO\text{—}R^2\text{—}CO\text{—}[(OR^3)_mO\text{—}CO\text{—}R^2\text{—}CO\text{—}]_nOR^1 \quad (I)$$

wherein $R^1$ is an alkyl group having from 1 to 4 carbon atoms; $R^2$ is an alkylene group having from 2 to 4 carbon atoms; $R^3$ is an alkylene group having from 2 to 6 carbon atoms, m is the number of from 1 to 6, and n is the number of from 1 to 12, with proviso that all of $R^2$'s may be identical or different, and that all of $R^3$'s may be identical or different; and Compound Group (C) a compound represented by the formula (II):

$$R^4\text{—}O(A^1O)_x\text{—}\overset{\overset{O}{\|}}{P}\underset{(OA^3)_zO\text{—}R^6}{\overset{(OA^2)_yO\text{—}R^5}{\diagup}} \quad (II)$$

wherein each of $R^4$, $R^5$, and $R^6$ is independently an alkyl group having from 1 to 4 carbon atoms; each of $A^1$, $A^2$, and $A^3$ is independently an alkylene group having 2 or 3 carbon atoms; and each of x, y, and z is independently a positive number showing the average number of moles of an oxyalkylene group added, wherein x+y+z satisfies a number of exceeding 3 and 12 or less;

<20> the polylactic acid resin composition according to any one of the above <16> to <19>, wherein the plasticizer is preferably at least one member selected from the group consisting of esters obtained from acetic acid and an adduct of glycerol reacted with ethylene oxide in an amount of from 3 to 6 mol on average (reacted with ethylene oxide in an amount of from 1 to 2 mol per one hydroxyl group);

esters obtained from acetic acid and an adduct of polyethylene glycol reacted with ethylene oxide in an amount of from 4 to 6 mol on average;

esters obtained from succinic acid and a polyethylene glycol monomethyl ether reacted with ethylene oxide in an amount of from 2 to 3 mol on average (reacted with ethylene oxide in an amount of from 2 to 3 mol per one hydroxyl group);

esters obtained from adipic acid and diethylene glycol monomethyl ether; and esters obtained from 1,3,6-hexanetricarboxylic acid and diethylene glycol monomethyl ether;

<21> the polylactic acid resin composition according to any one of the above <16> to <20>, wherein preferably the content of one or more members selected from the group consisting of polyester-based plasticizers, polyhydric alcohol ester-based plasticizers, polycarboxylic acid ester-based plasticizers, and phosphoric ester-based plasticizers, or the ester compound and/or ether compound having a (poly)oxyalkylene group or an alkylene group having from 2 to 6 carbon atoms, more preferably the content of one or more members selected from the group consisting of polyester-based plasticizers, polyhydric alcohol ester-based plasticizers, polycarboxylic acid ester-based plasticizers, and phosphoric ester-based plasticizers, each having a (poly)oxyalkylene group or an alkylene group having from 2 to 6 carbon atoms, and even more preferably the content of one or more compounds selected from the group consisting of Compound Groups (A) to (C), is preferably 50% by mass or more, more preferably 80% by mass or more, even more preferably 90% by mass or more, and even more preferably substantially 100% by mass, of the plasticizer;

<22> the polylactic acid resin composition according to any one of the above <16> to <21>, wherein the content of the plasticizer, based on 100 parts by mass of the polylactic acid resin, is preferably 0.1 parts by mass or more, more preferably 1 part by mass or more, even more preferably 3 parts by mass or more, even more preferably 5 parts by mass or more, even more preferably 6 parts by mass or more, and still even more preferably 8 parts by mass or more, and preferably 30 parts by mass or less, more preferably 25 parts by mass or less, even more preferably 20 parts by mass or less, even more preferably 18 parts by mass or less, even more preferably 15 parts by mass or less, and still even more preferably 12 parts by mass or less;

<23> the polylactic acid resin composition according to any one of the above <1> to <22>, further containing a hydrolysis inhibitor;

<24> the polylactic acid resin composition according to any one of the above <1> to <23>, wherein the content of the polylactic acid resin is preferably 50% by mass or more, more preferably 60% by mass or more, even more preferably 67% by mass or more, and still even more preferably 69% by mass or more, and preferably 90% by mass or less, more preferably 80% by mass or less, and even more preferably 75% by mass or less, of the polylactic acid resin composition;

<25> a polylactic acid resin molded article, obtainable by injection-molding a polylactic acid resin composition as defined in any one of the above <1> to <24>; and <26> a method for producing a polylactic acid resin molded article, including injection-molding a polylactic acid resin composition as defined in any one of the above <1> to <24>.

EXAMPLES

The present invention will be described more specifically by means of the following examples. The examples are given solely for the purposes of illustration and are not to be construed as limitations of the present invention. Parts in Examples are parts by mass, unless specified otherwise. Here, "a normal pressure" means 101.3 kPa, and "an ambient temperature" means a temperature of from 15° to 25° C.

[Average Fiber Length, Average Fiber Diameter, Average Aspect Ratio of Glass Fibers]

The average fiber length of the glass fibers is obtained by observing fiber lengths of randomly chosen 100 strands of glass fibers with an optical microscope, and calculating a number average thereof. The average fiber diameter can be obtained in the same manner as above for a diameter of the cross section of the glass fibers cut. When there are a length and a breadth in the fiber diameter, calculation is made using the length. The average aspect ratio is obtained from the average fiber length and the average fiber diameter.

[Average Particle Size of Metallic Pigment]

The average particle size of the metallic pigment means a volume-median particle size $D_{50}$, and the volume-median particle size $D_{50}$ is measured with a laser diffraction scattering particle size distribution instrument "Mastersizer 2000," manufactured by Malvern Instruments, Ltd., by charging a cell for measurement with Isopar G, manufactured by Exxon Mobile Corporation, under conditions that a particle refractive index is 1.58, imaginary part being 0.1, and a dispersion medium refractive index of 1.42, at a concentration that gives a scattering intensity of from 5 to 15%.

[Acid Value, Hydroxyl Value, and Saponification Value of Ester Compound of Compound Group (B)]

Acid Value: The analysis is carried out in accordance with a test method as prescribed in JIS K 0070, except that toluene/ethanol =2/1 (volume ratio) is used as a titration solvent.

Hydroxyl Value: The analysis is carried out in accordance with a test method as prescribed in JIS K 0070, except that acetic anhydride/pyridine =1/4 (volume ratio) is used as an acetylation reagent, and that the amount is changed to 3 mL.

Saponification Value: The analysis is carried out in accordance with a test method as prescribed in JIS K 0070, except that the temperature of the water bath is changed to 95°C, and that the heating time is changed to one hour.

[Molecular Weight, Terminal Alkyl Esterification Percentage, and Ether Group Value of Ester Compound of Compound Group (B)]

Molecular Weight: The molecular weight of the ester compound of (B) as used herein means a number-average molecular weight, which is calculated according to the following formulas from an acid value, a hydroxyl value, and a saponification value:

$$\text{Average Molecular Weight } M=(M_1+M_2-M_3\times 2)\times n + M_1(M_3-17.01)\times 2+(M_3-17.01)\times p+(M_2-17.01)\times q+1.01\times(2-p-q)$$

q=Hydroxyl Value×M÷56110

2−p−q=Acid Value×M÷56110

Average Degree of Polymerization n=Saponification Value×M÷(2×56110)−1

Terminal Alkyl Esterification Percentage: The alkyl esterification percentage at the molecular terminals, i.e. the terminal alkyl esterification percentage, can be calculated by the following formula. The larger the numerical value of the alkyl esterification percentage at the molecular terminals, the smaller the number of free carboxyl groups and free hydroxyl groups, showing that the molecular terminals are sufficiently subjected to alkyl esterification.

Terminal Alkyl Esterification Percentage (%)=(p÷2)×100 wherein $M_1$: a molecular weight of a diester obtained from a dicarboxylic acid used as a raw material and a monohydric alcohol used as a raw material;

$M_2$: a molecular weight of a dihydric alcohol used as a raw material;

$M_3$: a molecular weight of a monohydric alcohol used as a raw material;

p: the number of terminal alkyl ester groups in one molecule; and q: the number of terminal hydroxyl groups in one molecule.

Ether Group Value: The ether group value is calculated in units of the number of mmol of the ether groups in one gram of a carboxylic acid ester, in accordance with the following formula.

Ether Group Value (mmol/g)=(m−1)×n×1000÷M wherein m is an average number of repeats of oxyalkylene groups, i.e. m−1 stands for the number of ether groups in one molecule of the dihydric alcohol.

Incidentally, in a case where plural kinds of dicarboxylic acids, monohydric alcohols or dihydric alcohols are used, as the molecular weight a number-average molecular weight is used.

Production Example 1 of Plasticizer

Diester Obtained from Succinic Acid and Triethylene Glycol Monomethyl Ether

A 3-L flask equipped with a stirrer, a thermometer, and a dehydration tube was charged with 500 g of succinic anhydride, 2,463 g of triethylene glycol monomethyl ether, and 9.5 g of paratoluenesulfonic acid monohydrate, and the contents were allowed to react at 110° C. for 15 hours under a reduced pressure of from 4 to 10.7 kPa, while blowing nitrogen at 500 mL/min in a space portion. The liquid reaction mixture had an acid value of 1.6 mgKOH/g. To the liquid reaction mixture was added 27 g of an adsorbent KYOWAAD 500SH manufactured by Kyowa Chemical Industry Co., Ltd., and the mixture was stirred at 80° C. and 2.7 kPa for 45 minutes, and filtered. Thereafter, triethylene glycol monomethyl ether was distilled off at a liquid temperature of from 115° to 200° C. and a pressure of 0.03 kPa, and after cooling to 80° C., the residue was filtered under a reduced pressure, to provide a diester obtained, from succinic acid and triethylene glycol monomethyl ether, $(MeEO_3)_2SA$, as a filtrate. The diester obtained had a weight-average molecular weight of 410, a viscosity at 23° C. of 27 mPa·s, an acid value of 0.2 mgKOH/g, a saponification value of 274 mgKOH/g, a hydroxyl value of 1 mgKOH/g or less, and a hue APHA of 200.

Production Example 2 of Plasticizer

Diester Obtained from Succinic Acid and 1,3-Propanediol and Methanol, Raw Materials (Molar Ratio): Dimethyl Succinate/1,3-Propanediol (1.5/1)

A four-necked flask equipped with a stirrer, a thermometer, a dropping funnel, a distillation tube, and a nitrogen blowing tube was charged with 521 g (6.84 mol) of 1,3-propanediol and 5.9 g of a 28% by mass sodium methoxide-containing methanol solution (sodium methoxide: 0.031 mol) as a catalyst, and methanol was distilled off, while stirring at 120° C. and a normal pressure for 0.5 hours. Thereafter, 1,500 g (10.26 mol) of dimethyl succinate manufactured by Wako Pure Chemical Industries, Ltd. was added dropwise thereto over 1 hour, and the contents were allowed to react at 120° C. and a normal pressure to distill off methanol formed by the reaction. Next, the temperature was cooled to 60° C., and 5.6 g of a 28% by mass sodium methoxide-containing methanol solution (sodium methoxide: 0.029 mol) was added thereto. The temperature was raised to 120° C. over 2 hours, and the pressure was then gradually dropped from a normal pressure to 3.7 kPa over 1 hour, to distill off methanol. Thereafter, the temperature was cooled to 80° C., 18 g of KYOWAAD 600S manufactured by Kyowa Chemical Industry Co., Ltd. was added thereto, and the mixture was stirred at 80° C. and a pressure of 4.0 kPa for 1 hour, and then filtered under a reduced pressure. The temperature of the filtrate was raised from 85° to 194° C. at a pressure of 0.1 kPa over 2.5 hours to distill off the residual dimethyl succinate, to provide a yellow liquid at an ambient temperature. Here, the amount of the catalyst used was 0.58 mol per 100 mol of the dicarboxylic acid ester (in the formula (I), $R^1$: methyl, $R^2$: ethylene, $R^3$: 1,3-propylene, m=1, n=4.4; acid value: 0.64 mgKOH/g, hydroxyl value: 1.3 mgKOH/g, saponification value: 719.5 mgKOH/g, number-average molecular weight: 850; terminal alkyl esterification percentage: 98.5%; ether group value: 0 mmol/g).

Production Example 3 of Plasticizer

Tris(ethoxyethoxyethyl) Phosphate

A 1-liter four-neck flask was charged with 600 g (4.47 mol) of diethylene glycol monoethyl ether, and the content was stirred under a reduced pressure of 20 kPa, while blowing a dry nitrogen gas at a flow rate of 50 mL per minute. Next, 114 g (0.745 mol) of phosphorus oxychloride was slowly added dropwise while keeping the internal of the reaction system at room temperature (15° C.), and the mixture was then aged at 40° to 60° C. for 5 hours. Thereafter, 149 g of a 16% by mass aqueous sodium hydroxide solution was added thereto to neutralize, and an excess unreacted diethylene glycol monoethyl ether was distilled off under a reduced pressure, under the temperature conditions of from 70° to 120° C. Further, the residue was contacted with steam, to provide 367 g of a crude phosphoric triester. Further, to this crude phosphoric triester was added 300 g of a 16% by mass aqueous sodium chloride solution to wash the crude phosphoric triester. Thereafter, a lower layer of the separated layers was discarded, and the remaining upper layer was dehydrated at 75° C. under a reduced pressure, and thereafter further filtered to remove a solid content, to provide 266 g of an intended tris(ethoxyethoxyethyl) phosphate (yield: 80%). This tris(ethoxyethoxyethyl) phosphate was a colorless, transparent homogeneous liquid, and was subjected to chlorine ion analysis. As a result, the tris(ethoxyethoxyethyl) phosphate had a chlorine ion content of 10 mg/kg or less.

Production Example 1 of Glass Fibers (Glass Fibers A)

In a batch-process agitation tank type pulverizer ("Sand Grinder" manufactured by Igarashi Machines Seisakusho, container volume: 800 mL, filled with 720 g of zirconia beads having a diameter of 5 mm, filling ratio: 25%, diameter of agitation blades: 70 mm) as a pulverizer, 50 g of glass fibers CSF3PE-941HS were supplied. While allowing a cooling water to flow through a container jacket, the contents were subjected to a pulverization treatment at a rotational speed of agitation of 500 r/min for 30 minutes, to provide pulverized glass fibers. The glass fibers obtained had an average fiber length of 150 μm, an average fiber diameter of 13 μm, and an average aspect ratio of 12.

Production Example 2 of Glass Fibers (Glass Fibers B)

In a batch-process agitation tank type pulverizer ("Sand Grinder" manufactured by Igarashi Machines Seisakusho, container volume: 800 mL, filled with 720 g of zirconia beads having a diameter of 5 mm, filling ratio: 25%, diameter of agitation blades: 70 mm) as a pulverizer, 50 g of glass fibers CSF3PE-941HS were supplied. While allowing a cooling water to flow through a container jacket, the contents were subjected to a pulverization treatment at a rotational speed of agitation of 500 r/min for 1 minute, to provide pulverized glass fibers. The glass fibers obtained had an average fiber length of 1.4 mm, an average fiber diameter of 13 μm, and an average aspect ratio of 108.

Examples 1 to 17 and Comparative Examples 1 to 7

Preparation of Polylactic Acid Resin Composition

Raw materials for polylactic acid resin compositions as listed in any of Tables 1 to 4 were melt-kneaded with a twin-screw extruder manufactured by Ikegai Corporation, PCM-45 at a rotational speed of 100 r/min and a melt-kneading temperature of 190° C., and the kneaded mixture was strand-cut, to provide pellets of a polylactic acid resin composition. The pellets obtained were dried at 70° C. under a reduced pressure for an entire day, so as to have a water content of 500 ppm or less.

Preparation of Injection-Molded Article

Next, the pellets obtained were injection-molded with an injection-molding machine manufactured by The Japan Steel Works, Ltd., J75E-D, of which cylinder temperature was set at 200° C., to mold into test pieces [flat plate (70 mm×40 mm×3 mm), rectangular test pieces (125 mm×12 mm×6 mm), and rectangular test pieces (63 mm×12 mm×5 mm)] in a mold at 80° C.

During the preparation, the time needed to judge that each of the test pieces does not undergo deformation, and it is easy to demold the molded article from a mold was measured as a mold holding time necessary for demolding, and an average was calculated to evaluate moldability. Also, in a case where a mold holding time was needed to be 240 seconds or longer, it was evaluated as not demoldable. Here, the same procedures as in Example 1 were carried out to prepare test pieces for Comparative Examples 1 and 2, except that a molding temperature for Comparative Example 1 was set at 30° C., and that the cylinder temperature for Comparative Example 2 was set at 260° C.

Here, the raw materials in Tables 1 to 4 are as follows.

<Resin>

PLA: Polylactic acid resin, manufactured by Nature Works LLC, poly-L-lactic acid, Nature Works 4032D, weight-average molecular weight: 200,000

PP: Polypropylene resin, manufactured by Nippon Polypropylene Corporation, NOVATEC BCO3B, weight-average molecular weight: 142,000

PC: Polycarbonate resin, manufactured by Teijin Chemicals, Panlite L-1225WP, viscosity-average molecular weight: 22,500

<Glass Fibers>

CSF3PE-941HS: Chopped strand, manufactured by NITTOBO, CSF3PE-941HS, average fiber length: 3 mm, average fiber diameter: 13 μm, average aspect ratio: 231

PF E-301: Cut fibers, manufactured by NITTOBO, PF E-301, average fiber length: 25 μm, average fiber diameter: 10 μm, average aspect ratio: 2.5

ACS9PH-901X: Chopped strand, manufactured by Nippon Electric Glass Co., Ltd., ACS9PH-901X, average fiber length: 9 mm, average fiber diameter: 18 μm, average aspect ratio: 500

ACS13H-350Z: Chopped strand, manufactured by Nippon Electric Glass Co., Ltd., ACS13H-350Z, average fiber length: 13 mm, average fiber diameter: 14 μm, average aspect ratio: 929

Glass Fibers A: Pulverized glass fibers produced according to Production Example 1 of Glass Fibers, average fiber length: 150 μm, average fiber diameter: 13 μm, average aspect ratio: 12

Glass Fibers B: Pulverized glass fibers produced according to Production Example 2 of Glass Fibers, average fiber length: 1.4 mm, average fiber diameter: 13 μm, average aspect ratio: 108

<Metallic Pigment>

Aluminum Pigment: Aluminum paste, manufactured by TOYO ALUMINIUM K.K., NME060T4, average particle size: 60 μm <Plasticizer>

DAIFATTY-101: One manufactured by DAIHACHI CHEMICAL INDUSTRY CO., LTD., "DAIFATTY-101," a diester obtained from adipic acid and a 1/1 mixture of diethylene glycol monomethyl ether/benzyl alcohol A-1010: A diester obtained from succinic acid and triethylene glycol monomethyl ether, produced according to Production Example 1 of Plasticizer DOA: Bis(2-ethylhexyl)adipate, manufactured by DAIHACHI CHEMICAL INDUSTRY CO., LTD., DOA MeSA-1,3PD: A diester obtained from succinic acid and 1,3-propanediol and methanol, produced according to Production Example 2 of Plasticizer TEP-2: Tris(ethoxyethoxyethyl) phosphate, produced according to Production Example 3 of Plasticizer <Organic Crystal Nucleating Agent>

PPA-Zn: A zinc salt of unsubstituted phenylphosphonic acid, manufactured by NISSAN CHEMICAL INDUSTRIES, LTD.

SLIPACKS H: Ethylenebis 12-hydroxystearamide, manufactured by Nippon Kasei Chemical Co., Ltd.

<Filler>

Talc: One manufactured by Nippon Talc, MICRO ACE P-6

<Hydrolysis Inhibitor>

Carbodilite LA-1: Polycarbodiimide, manufactured by Nisshinbo Chemical Inc.

The properties of the molded articles obtained were evaluated in accordance with the following Test Example 1. The results are shown in Tables 1 to 4.

Test Example 1

External Appearances

The test pieces were visually observed for nashiji-toned patterns, a lamellar texture, and a transparent layer, and evaluated in accordance with the following evaluation criteria.

[Evaluation Criteria for External Appearances]
(Nashiji-Toned Patterns)
A: Uniform nashiji-toned patterns being formed;
B-1: Nashiji-toned patterns being partly formed, of which patterns are vivid;
B-2: Nashiji-toned patterns being partly formed, of which patterns are weak; and
C: Nashiji-toned patterns being hardly formed.

(Lamellar Texture)
A: Luster of a lamellar texture being evenly distributed vividly;
B-1: Luster of a lamellar texture being vivid, while being unevenly distributed;
B-2: Luster of a lamellar texture being weak, while being unevenly distributed; and
C: Luster of a lamellar texture being hardly found.

(Transparent Layer)
A: A transparent layer being evenly and clearly formed on a surface layer of the resin;
B-1: A transparent layer being partly formed on a surface layer of the resin, and being distinct layer;
B-2: A transparent layer being partly formed on a surface layer of the resin, and being a thin layer;
C: A transparent layer being hardly formed on a surface layer of the resin.

TABLE 1

| | | Examples | | | | | | |
|---|---|---|---|---|---|---|---|---|
| | | 1 | 2 | 3 | 4 | 5 | 6 | 7 |
| Resin | PLA | 100 | 100 | 100 | 100 | 100 | 100 | 100 |
| | PP | — | — | — | — | — | — | — |
| | PC | — | — | — | — | — | — | — |
| Glass Fibers | CSF3PE-941HS (Aspect Ratio: 231) | 15 | 7 | 25 | 15 | 15 | 15 | 15 |
| | PF E-301 (Aspect Ratio: 2.5) | — | — | — | — | — | — | — |
| Metallic Pigment | Aluminum Pigment | 1 | 1 | 1 | 0.5 | 3 | 1 | 1 |
| Plasticizer | DAIFATTY-101 | 10 | 10 | 10 | 10 | 10 | — | — |
| | A-1010 | — | — | — | — | — | 10 | — |
| | DOA | — | — | — | — | — | — | 10 |
| Organic Crystal | PPA-Zn | 0.5 | 0.5 | 0.5 | 0.5 | 0.5 | 0.5 | 0.5 |
| Nucleating Agent | SLIPACKS H | 0.5 | 0.5 | 0.5 | 0.5 | 0.5 | 0.5 | 0.5 |
| Filler | Talc | 10 | 10 | 10 | 10 | 10 | 10 | 10 |
| Hydrolysis Inhibitor | Carbodilite LA-1 | 3 | 3 | 3 | 3 | 3 | 3 | 3 |
| | Glass Fibers/Metallic Pigment | 15 | 7 | 25 | 30 | 5 | 15 | 15 |
| | Content of Polylactic Acid Resin, % by Mass | 71.4 | 75.8 | 66.7 | 71.7 | 70.4 | 71.4 | 71.4 |
| Moldability | Mold Temp., °C. | 80 | 80 | 80 | 80 | 80 | 80 | 80 |
| | Mold Holding Time, sec | 45 | 50 | 50 | 45 | 50 | 50 | 70 |
| External Appearance | Nashiji Patterns | A | B-1 | B-1 | A | A | A | B-1 |
| | Lamellar Texture | A | A | A | A | A | A | B-1 |
| | Formation of Transparent Layer | A | A | A | A | A | A | B-1 |

TABLE 2

| | | Comparative Examples | | | | | | |
|---|---|---|---|---|---|---|---|---|
| | | 1 | 2 | 3 | 4 | 5 | 6 | 7 |
| Resin | PLA | — | — | 100 | 100 | 100 | 100 | 100 |
| | PP | 100 | — | — | — | — | — | — |
| | PC | — | 100 | — | — | — | — | — |
| Glass Fibers | CSF3PE-941HS (Aspect Ratio: 231) | 15 | 15 | 1 | 40 | 15 | 15 | — |
| | PF E-301 (Aspect Ratio: 2.5) | — | — | — | — | — | — | 15 |
| Metallic Pigment | Aluminum Pigment | 1 | 1 | 1 | 1 | 0.05 | 10 | 1 |
| Plasticizer | DAIFATTY-101 | 10 | 10 | 10 | 10 | 10 | 10 | 10 |
| | A-1010 | — | — | — | — | — | — | — |
| | DOA | — | — | — | — | — | — | — |
| Organic Crystal | PPA-Zn | 0.5 | 0.5 | 0.5 | 0.5 | 0.5 | 0.5 | 0.5 |
| Nucleating Agent | SLIPACKS H | 0.5 | 0.5 | 0.5 | 0.5 | 0.5 | 0.5 | 0.5 |
| Filler | Talc | 10 | 10 | 10 | 10 | 10 | 10 | 10 |
| Hydrolysis Inhibitor | Carbodilite LA-1 | 3 | 3 | 3 | 3 | 3 | 3 | 3 |

TABLE 2-continued

|  |  | Comparative Examples | | | | | | |
|---|---|---|---|---|---|---|---|---|
|  |  | 1 | 2 | 3 | 4 | 5 | 6 | 7 |
| Glass Fibers/Metallic Pigment | | 15 | 15 | 1 | 40 | 300 | 1.5 | 15 |
| Content of Polylactic Acid Resin, % by Mass | | 71.4 | 71.4 | 79.4 | 60.6 | 71.9 | 67.1 | 71.4 |
| Moldability | Mold Temp., °C. | 30 | 80 | 80 | 80 | 80 | 80 | 80 |
|  | Mold Holding Time, sec | 45 | 45 | 60 | Not Moldable | 45 | 70 | 70 |
| External Appearance | Nashiji Patterns | B-1 | C | C | — | B-1 | C | C |
|  | Lamellar Texture | B-1 | B-1 | B-1 | — | C | C | C |
|  | Formation of Transparent Layer | C | B-1 | B-1 | — | B-1 | B-1 | C |

TABLE 3

|  |  | Examples | | | | |
|---|---|---|---|---|---|---|
|  |  | 1 | 8 | 9 | 10 | 11 |
| Resin | PLA | 100 | 100 | 100 | 100 | 100 |
| Glass Fibers | Glass Fibers A (Aspect Ratio: 12) | — | 15 | — | — | — |
|  | Glass Fibers B (Aspect Ratio: 108) | — | — | 15 | — | — |
|  | CSF3PE-941HS (Aspect Ratio: 231) | 15 | — | — | — | — |
|  | ACS9PH-901X (Aspect Ratio: 500) | — | — | — | 15 | — |
|  | ACS13H-350Z (Aspect Ratio: 929) | — | — | — | — | 15 |
| Metallic Pigment | Aluminum Pigment | 1 | 1 | 1 | 1 | 1 |
| Plasticizer | DAIFATTY-101 | 10 | 10 | 10 | 10 | 10 |
|  | MeSA-1,3PD | — | — | — | — | — |
|  | TEP-2 | — | — | — | — | — |
| Organic Crystal | PPA-Zn | 0.5 | 0.5 | 0.5 | 0.5 | 0.5 |
| Nucleating Agent | SLIPACKS H | 0.5 | 0.5 | 0.5 | 0.5 | 0.5 |
| Filler | Talc | 10 | 10 | 10 | 10 | 10 |
| Hydrolysis Inhibitor | Carbodilite LA-1 | 3 | 3 | 3 | 3 | 3 |
| Glass Fibers/Metallic Pigment | | 15 | 15 | 15 | 15 | 15 |
| Content of Polylactic Acid Resin, % by Mass | | 71.4 | 71.4 | 71.4 | 71.4 | 71.4 |
| Moldability | Mold Temp., °C. | 80 | 80 | 80 | 80 | 80 |
|  | Mold Holding Time, sec | 45 | 50 | 50 | 50 | 50 |
| External Appearance | Nashiji Patterns | A | B-2 | A | A | B-1 |
|  | Lamellar Texture | A | A | A | A | A |
|  | Formation of Transparent Layer | A | A | A | A | A |

TABLE 4

|  |  | Examples | | | | | |
|---|---|---|---|---|---|---|---|
|  |  | 12 | 13 | 14 | 15 | 16 | 17 |
| Resin | PLA | 100 | 100 | 100 | 100 | 100 | 100 |
| Glass Fibers | CSF3PE-941HS (Aspect Ratio: 231) | 15 | 15 | 2 | 35 | 15 | 15 |
| Metallic Pigment | Aluminum Pigment | 1 | 1 | 1 | 1 | 0.1 | 8 |
| Plasticizer | DAIFATTY-101 | — | — | 10 | 10 | 10 | 10 |
|  | MeSA-1,3PD | 10 | — | — | — | — | — |
|  | TEP-2 | — | 10 | — | — | — | — |
| Organic Crystal | PPA-Zn | 0.5 | 0.5 | 0.5 | 0.5 | 0.5 | 0.5 |
| Nucleating Agent | SLIPACKS H | 0.5 | 0.5 | 0.5 | 0.5 | 0.5 | 0.5 |
| Filler | Talc | 10 | 10 | 10 | 10 | 10 | 10 |
| Hydrolysis Inhibitor | Carbodilite LA-1 | 3 | 3 | 3 | 3 | 3 | 3 |
| Glass Fibers/Metallic Pigment | | 15 | 15 | 2 | 35 | 150 | 1.9 |
| Content of Polylactic Acid Resin, % by Mass | | 71.4 | 71.4 | 78.7 | 62.5 | 71.9 | 68.0 |
| Moldability | Mold Temp., °C. | 80 | 80 | 80 | 80 | 80 | 80 |
|  | Mold Holding Time, sec | 50 | 50 | 50 | 50 | 50 | 50 |
| External Appearance | Nashiji Patterns | A | A | B-2 | B-1 | A | B-2 |
|  | Lamellar Texture | A | A | A | B-2 | B-2 | A |
|  | Formation of Transparent Layer | A | A | A | B-2 | A | B-2 |

Figure 2:
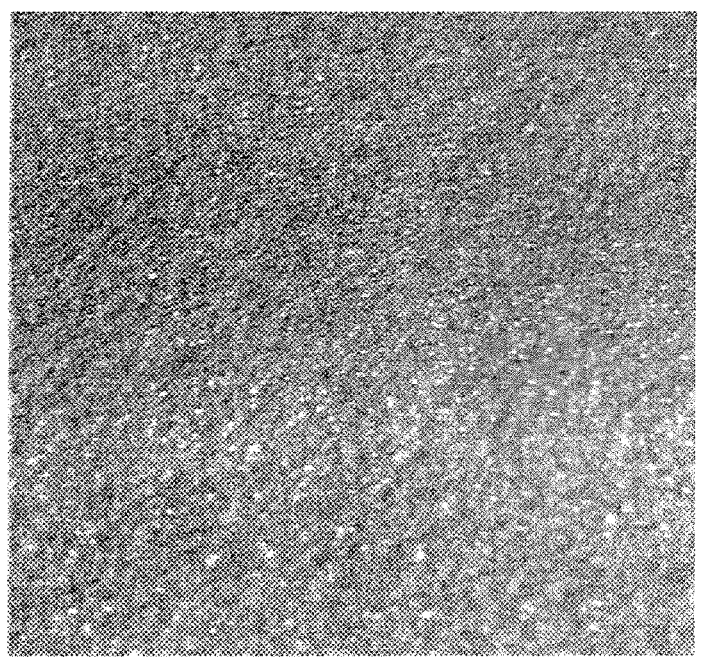
FIG. 2 is a view showing a part of the surface of an injection-molded article of Example 1 (magnification: 4 folds).
Figure 3:
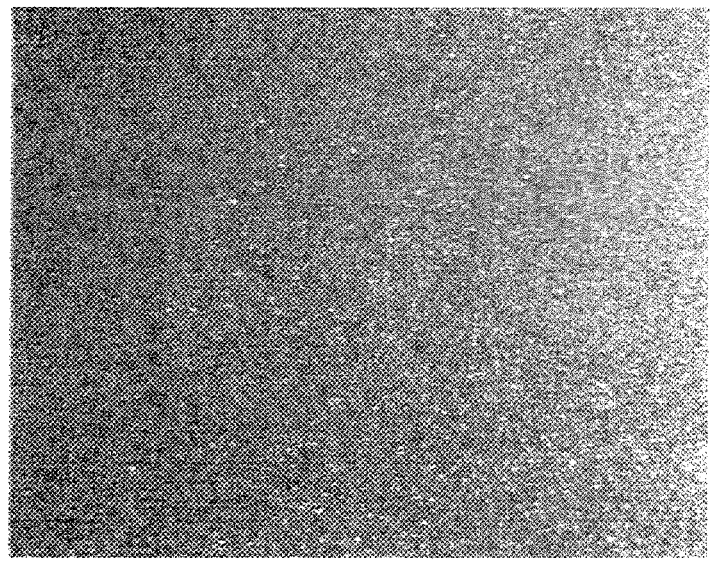
FIG. 3 is a view showing a part of the surface of an injection-molded article of Comparative Example 1 (magnification: 4 folds).
Figure 4:
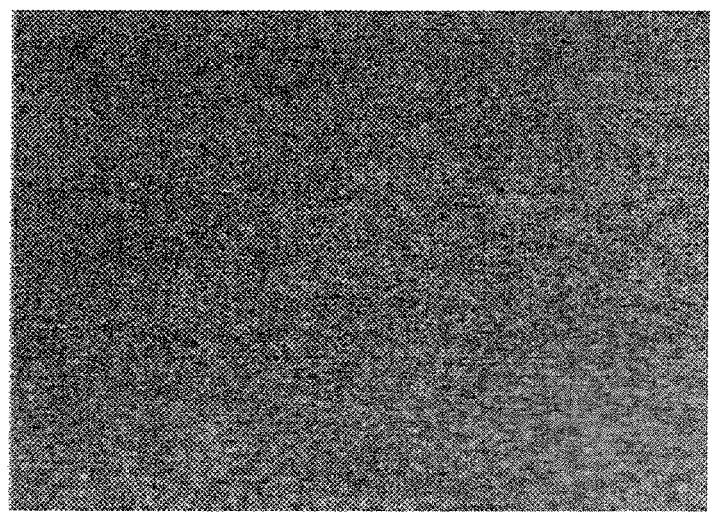
FIG. 4 is a view showing a part of the surface of an injection-molded article of Comparative Example 2 (magnification: 4 folds).

It can be seen from the results of Tables 1 to 4 that the polylactic acid resin compositions of the present invention have excellent moldability, and the injection-molded articles obtained also have high designability with a lamellar texture in the nashiji patterns under the transparent layer of the surface. Also, the external appearances of the surface of Example 1 are shown in FIGS. 1 and 2. On the other hand, in a case of Comparative Example 1 where a polypropylene resin was blended, the molded article became opaque because the crystallization was rapid, so that nashiji patterns and lamellar textures were not fully exhibited (see FIG. 3). Here, the mold temperature was lowered because the crystallization temperature was low. In Comparative Example 2, the resin was uniformly transparent because a polycarbonate resin was an amorphous resin, but undercoating textures of nashiji patterns could not be obtained as in Examples (see FIG. 4).

It can be seen from the comparisons of Examples 1 to 3, 14, and 15, and Comparative Examples 3 and 4 that the use of the glass fibers in a particular mass based on the polylactic acid resin gives excellent nashiji patterns, a lamellar texture, and formation of a transparent layer. In other words, Example 1 is excellent, Examples 2 and 3 are to follow next in being excellent, and Examples 14 and 15 are to follow even next in being excellent.

It can be seen from the comparisons of Examples 1, 4, 5, 16, and 17, and Comparative Examples 5 and 6 that the use of the metallic pigment in a particular mass based on the polylactic acid resin gives excellent nashiji patterns, a lamellar texture, and formation of a transparent layer. In other words, Example 1 is excellent, Examples 4 and 5 are to follow next in being excellent, and Examples 16 and 17 are to follow even next in being excellent.

It can be seen from the comparisons of Examples 1, 8, 9, 10, and 11, and Comparative Example 7 that the use of the glass fibers in a particular aspect ratio gives excellent nashiji patterns, a lamellar texture, and formation of a transparent layer. In other words, Examples 1, 9, and 10 are excellent, Example 11 is to follow next in being excellent, and Example 8 is to follow even next in being excellent.

It can be seen from the comparisons of Examples 1, 6, 7, 12, and 13 that a particular plasticizer gives excellent nashiji patterns, a lamellar texture, and formation of a transparent layer. In other words, it can be seen that the use of the plasticizers of Examples 1, 6, 12, and 13 is preferred.

INDUSTRIAL APPLICABILITY

The polylactic acid resin composition of the present invention can be suitably used in various industrial applications, such as daily sundries, household electric appliance parts, packaging materials for household electric appliance parts, and automobile parts.

The invention claimed is:

1. A polylactic acid resin molded article obtained by injection-molding a polylactic acid resin composition, wherein the polylactic acid resin molded article has a transparent surface layer and a lamellar texture under the transparent layer, the polylactic acid resin composition comprising a polylactic acid resin, glass fibers having an average aspect ratio (average fiber length/average fiber diameter) of 5 or more, and a metallic pigment, wherein said glass fibers are contained in an amount of from 2 to 35 parts by mass, and said metallic pigment is contained in an amount of from 0.1 to 8 parts by mass, based on 100 parts by mass of the polylactic acid resin.

2. The polylactic acid resin molded article according to claim 1, wherein a mass ratio of the glass fibers to the metallic pigment (glass fibers/metallic pigment) is from 1 to 200.

3. The polylactic acid resin molded article according to claim 1, wherein the polylactic acid resin composition further comprises an organic crystal nucleating agent.

4. The polylactic acid resin molded article according to claim 3, wherein the organic crystal nucleating agent comprises one or more members selected from the group consisting of hydroxyfatty acid bisamides and metal salts of phenylphosphonic acids.

5. The polylactic acid resin molded article according to claim 1, wherein the metallic pigment comprises an aluminum pigment.

6. The polylactic acid resin molded article according to claim 1, wherein the polylactic acid resin composition further comprises a plasticizer.

7. The polylactic acid resin molded article according to claim 6, wherein the plasticizer comprises one or more members selected from the group consisting of polyester-based plasticizers, polyhydric alcohol ester-based plasticizers, polycarboxylic acid ester-based plasticizers, and phosphoric ester-based plasticizers.

8. The polylactic acid resin molded article according to claim 6, wherein the plasticizer comprises an ester compound and/or ether compound having a (poly)oxyalkylene group or an alkylene group having from 2 to 6 carbon atoms.

9. The polylactic acid resin molded article according to claim 6, wherein the plasticizer comprises one or more members selected from the group consisting of:

(A): an ester compound comprising two or more ester groups in a molecule, wherein at least one kind of the alcohol component constituting the ester compound is an alcohol reacted with an alkylene oxide having from 2 to 3 carbon atoms in an amount of from 0.5 to 5 mol on average, per one hydroxyl group;

(B): a compound represented by the formula (I):

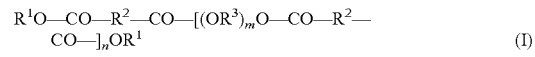

wherein $R^1$ is an alkyl group having from 1 to 4 carbon atoms; $R^2$ is an alkylene group having from 2 to 4 carbon atoms; $R^3$ is an alkylene group having from 2 to 6 carbon atoms, m is the number of from 1 to 6, and n is the number of from 1 to 12, with proviso that all of $R^2$'s may be identical or different, and that all of $R^3$'s may be identical or different; and (C): a compound represented by the formula (II):

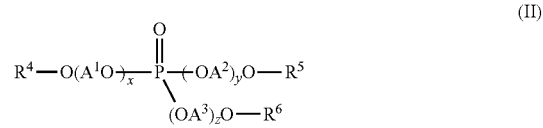

wherein each of $R^4$, $R^5$, and $R^6$ is independently an alkyl group having from 1 to 4 carbon atoms; each of $A^1$, $A^2$, and $A^3$ is independently an alkylene group having 2 or 3 carbon atoms; and each of x, y, and z is independently a positive number showing the average number of moles of an oxyalkylene group added, wherein $x+y+z$ satisfies a number of exceeding 3 and 12 or less.

10. The polylactic acid resin molded article according to claim 1, wherein the content of the glass fibers is 5 parts by mass or more and 28 parts by mass or less, based on 100 parts by mass of the polylactic acid resin.

11. The polylactic acid resin molded article according to claim 1, wherein the content of the metallic pigment is 0.2 parts by mass or more and 6 parts by mass or less, based on 100 parts by mass of the polylactic acid resin.

12. The polylactic acid resin molded article according to claim 1, wherein the mass ratio of the glass fibers to the metallic pigment (glass fibers/metallic pigment) is 2 or more and 80 or less.

13. The polylactic acid resin molded article according to claim 1, wherein the glass fibers have an average aspect ratio of 5 to 1,500 and an average length of 60 μm to 20 mm.

14. The polylactic acid resin molded article according to claim 1, wherein the glass fibers have an average aspect ratio of 12 to 929 and an average length of 150 μm to 13 mm.

* * * * *